(12) United States Patent
Suzuki

(10) Patent No.: US 7,319,543 B2
(45) Date of Patent: Jan. 15, 2008

(54) IMAGE FORMING SYSTEM

(75) Inventor: Yuusuke Suzuki, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 890 days.

(21) Appl. No.: 10/388,755

(22) Filed: Mar. 17, 2003

(65) Prior Publication Data

US 2004/0184067 A1 Sep. 23, 2004

(51) Int. Cl.
*G06K 5/04* (2006.01)
*G06K 15/00* (2006.01)
*G06K 15/02* (2006.01)

(52) U.S. Cl. ............... 358/1.9; 358/1.13; 358/1.16; 358/1.18; 358/1.17; 358/2.1; 358/462; 358/488

(58) Field of Classification Search ............... 358/1.13, 358/1.15, 1.9, 2.1, 1.12, 1.16, 1.18, 462, 358/488; 399/371
See application file for complete search history.

(56) References Cited

U.S. PATENT DOCUMENTS

| | | | | |
|---|---|---|---|---|
| 4,458,333 A * | 7/1984 | Smith | | 358/1.15 |
| 5,734,760 A * | 3/1998 | Yoshida | | 382/296 |
| 5,920,681 A * | 7/1999 | Hori | | 358/1.5 |
| 5,954,436 A * | 9/1999 | Kageyama et al. | | 400/188 |
| 6,160,633 A * | 12/2000 | Mori | | 358/1.5 |
| 6,515,758 B2 * | 2/2003 | Uda et al. | | 358/1.15 |
| 6,952,801 B2 * | 10/2005 | Warmus et al. | | 715/525 |
| 7,091,959 B1 * | 8/2006 | Clary | | 345/173 |
| 7,130,069 B1 * | 10/2006 | Honma | | 358/1.15 |
| 2001/0024292 A1 * | 9/2001 | Otake | | 358/1.15 |
| 2001/0024518 A1 * | 9/2001 | Yaguchi et al. | | 382/170 |

(Continued)

FOREIGN PATENT DOCUMENTS

EP 0 773 498 B1 5/2003

(Continued)

OTHER PUBLICATIONS

U.S. Appl. No. 10/310,955, filed Dec. 6, 2002, Suzuki.

*Primary Examiner*—King Y. Poon
*Assistant Examiner*—Chad Dickerson
(74) *Attorney, Agent, or Firm*—Foley & Lardner LLP

(57) ABSTRACT

An image forming system includes a PDL job receiving unit for receiving a PDL job generated by use of a page description language, a print image forming unit for interpreting the PDL job and forming a print image, a compression unit for compressing the print image, a storage unit for storing the compressed image formed by the compression unit, a hybrid print demand receiving unit for receiving a hybrid print demand that demands the compressed image in the storage unit to be hybrid-printed, an expansion unit for expanding the compressed image, and a transmitting unit for transmitting the expanded image formed by the expansion unit to a printer engine. The image forming system further includes a control unit for, when judging that the PDL job receiving unit receives the PDL job, forming the print image from the PDL job, compressing the print image and storing the compressed image in the storage unit, and when judging that the hybrid print demand receiving unit receives the hybrid print demand, expanding the compressed image in the storage unit by use of the expansion unit in response to the hybrid print demand, and sending the expanded image to the printer engine.

10 Claims, 19 Drawing Sheets

U.S. PATENT DOCUMENTS

| | | | |
|---|---|---|---|
| 2001/0031150 A1* | 10/2001 | Shimada et al. | 399/82 |
| 2001/0043349 A1* | 11/2001 | Bobrow et al. | 358/1.12 |
| 2001/0043355 A1* | 11/2001 | Bando | 358/1.15 |
| 2001/0043359 A1* | 11/2001 | Mori et al. | 358/1.15 |
| 2002/0015171 A1* | 2/2002 | Tsunekawa | 358/1.13 |
| 2002/0015180 A1* | 2/2002 | Tominaga | 358/1.15 |
| 2003/0095282 A1 | 5/2003 | Suzuki et al. | |

FOREIGN PATENT DOCUMENTS

| | | | |
|---|---|---|---|
| JP | 9-134261 A | | 5/1997 |
| JP | 2000-112704 A | | 4/2000 |
| JP | 2000112704 A | * | 4/2000 |
| JP | 2002-014785 A | | 1/2002 |
| JP | 2002014785 A | * | 1/2002 |

* cited by examiner

HYBRID OUTPUT INFORMATION

| PDL FILE NAME | PAGE |
|---|---|
| 1234.ps | 5-8 |
| 5678.ps | 1-2 |

FIG. 18

IMAGE FORMING SYSTEM

BACKGROUND OF THE INVENTION

The present invention relates to an image forming system for forming an image by use of PDL (Page Description Language) data received from a host computer, etc.

There has hitherto been an image forming system for printing on a print-job basis. A print job is defined as a data set extending over a plurality of pages in a case where, for instance, a certain user prints document data extending over the plurality of pages by utilizing an application software in the host computer.

In this image forming system, printing is performed in the following way. To be specific, at first, the host computer, etc. generates a PDL (Page Description Language) job (containing, for example, PDL page data for a plurality of pages) and sends this PDL job to a printer controller. The printer controller having received the PDL job converts each set of PDL page data of the PDL job into raster data, and generates a raster job by assembling pieces of raster data. the printer controller sequentially takes out the raster data of the raster job and sends the raster data to a printer. The printer having received the raster data forms an image on a sheet by use of the raster data.

In the image forming system described above, a case of hybrid-printing a plurality of PDL jobs involved using a method of generating one PDL job by editing the plurality of PDL jobs on the host computer.

Further, there was an alternative method of generating a raster job by rasterizing the PDL jobs received from the host computer, storing this raster job in a storage unit on the printer controller, then generating raster data by rasterizing image data received from a scanner, a FAX, etc., and storing the same raster data in the storage unit described above. According to this method, when the printer controller receives a hybrid print demand from the host computer, one raster job is generated by editing the raster job/raster data in the storage unit described above (such as hybridizing the raster job/raster data on, e.g., a page-by-page basis).

There were, however, problems inherent in the conventional hybrid printing methods including the methods given above.

Namely, there arose a problem that a capacity of the storage unit becomes deficient in the case of hybrid-printing, for instance, a large quantity of raster jobs. That is, when storing the large quantity of raster jobs, etc. in the storage unit in order to hybrid-print the raster jobs, the storage area (capacity) comes to a deficiency, and hence it happened that all the raster jobs were unable to be accumulated in the storage unit.

There was another problem, wherein it is difficult in reality that the image data from the scanner or the facsimile (FAX) are utilized for applications other than printing. Namely, the image data from the scanner or the FAX are, as explained above, stored in the state of being converted into the raster data in the printer controller. Generally, the raster data are not, however, generated in a format suited to the host computer, etc. It is therefore difficult to utilize the image data from the scanner or the FAX to the applications other than printing.

Further, there was a problem in which an image quality declines in the case of hybrid-printing the respective raster jobs with their sheet output directions (printing directions) different from each other. Namely, in the case of printing the respective raster jobs of which the sheet printing directions are different from each other (in the case of using, e.g., a staple function), it is required that the printing directions of the raster jobs be unified in a vertical or lateral direction. That is, if the printing direction of a certain raster job is set in the vertical direction while the printing direction of a different raster job is lateral, the printing directions of the two raster jobs are required to be unified. To be more specific, it is required that, for instance, each set of page data (each set of raster data) held by the different raster job be converted into data rotated through 90 degrees. The raster data have, however, already undergone a gradation process (screening) taking the sheet output direction (printing direction) into consideration when rasterized from the PDL page data. Hence, if the data conversion described above is executed, an original gradation state can not be kept. Consequently, when printing the post-converted raster data, the image quality declines. Accordingly, when the great majority of raster data to be hybrid-printed are converted, it follows that a large decline of the image quality occurs on the whole.

Moreover, in the case of hybrid-printing in a way that uses a plurality of raster jobs for color printing, as a result of the hybrid-printing, a color tone balance between the pages might be lost. Namely, there might differ color-related settings (e.g., a sharpness setting, a photo/text mode setting, etc.) for the respective raster jobs, and an environment (for instance, a setting of the application) on the host computer which has generated the PDL jobs corresponding to the respective raster jobs. In such a case, as a result of printing, there occurs a scatter in the color tones of the respective pages.

SUMMARY OF THE INVENTION

It is a primary object of the present invention to provide an image forming system capable of avoiding a variety of inconveniences inherent in the hybrid-printing as described above.

It is another object of the present invention to provide an image forming device capable of executing the hybrid-printing in a way that utilizes a small storage area.

It is still another object of the present invention to provide an image forming system capable of utilizing image data from a peripheral device such as a scanner, a FAX, etc. to applications other than printing.

It is a further object of the present invention to provide an image forming system capable of reducing deterioration of an image quality to the greatest possible degree in the case of hybrid-printing jobs with their sheet output directions different from each other.

It is a still further object of the present invention to provide an image forming system capable of equalizing display states of the respective printed pages even in the case of hybrid-printing the jobs with different color-display-related settings, and so on.

In order to accomplish the first object of the present invention, there is provided an image forming system comprising: a PDL job receiving unit for receiving a PDL job generated by use of a page description language; a print image forming unit for interpreting the PDL job and forming a print image; a compression unit for compressing the print image; a storage unit for storing the compressed image formed by said compression unit; a hybrid print demand receiving unit for receiving a hybrid print demand that demands the compressed image in said storage unit to be hybrid-printed; an expansion unit for expanding the compressed image; and a transmitting unit for transmitting the expanded image formed by said expansion unit to a printer engine, wherein said image forming system further comprises a control unit for, when judging that said PDL job receiving unit receives the PDL job, forming the print image from the PDL job by use of said print image forming unit, compressing the print image by use of said compression unit and storing the compressed image in said storage unit, and when judging that said hybrid print demand receiving unit receives the hybrid print demand, expanding the compressed image in said storage unit by use of said expansion unit in response to the hybrid print demand, and sending the expanded image to said printer engine.

In order to accomplish the second object of the present invention, there is provided an image forming system comprising: a PDL job receiving unit for receiving a PDL job generated by use of a page description language; a first print image forming unit for forming a first print image by interpreting the PDL job; a PDL-unsupported image receiving unit for receiving from a peripheral device a PDL-unsupported image having an image format that is not interpreted by the page description language; a storage unit for storing the first print image and the PDL-unsupported image; a hybrid print demand receiving unit for receiving a hybrid print demand for demanding a hybrid print of the first print image and the PDL-unsupported image in said storage unit; a second print image forming unit for converting the PDL-unsupported image into a PDL-supported image having an image format interpretable by the page description language, rewriting the PDL-supported image into PDL data using the page description language and forming a second print image by interpreting the PDL data; and a transmitting unit for transmitting the first and second print images to a printer engine, wherein said image forming system further comprises a control unit for, when judging that said PDL job receiving unit receives the PDL job, forming the first print image from the PDL job by use of said first print image forming unit, storing the first print image in said storage unit, when judging that said PDL-unsupported image receiving unit receives the PDL-unsupported image, storing the PDL-unsupported image in said storage unit, and when judging that said hybrid print demand receiving unit receives the hybrid print demand, forming the second print image from the PDL-unsupported image in said storage unit by use of said second print image forming unit, and sending the first and second print images in the sequence based on the hybrid print demand to said printer engine.

In order to accomplish the third object, there is provided an image forming system comprising: a PDL job receiving unit for receiving a PDL job generated by use of a page description language and having print direction information; a print image forming unit for forming a print image by interpreting the PDL job; a storage unit for storing the print images; a hybrid print demand receiving unit for receiving a hybrid print demand for demanding a hybrid print of a plurality of print images in said storage unit; print direction determining unit for unifying print directions of the plurality of print images into the same print direction and thus determining the print direction; an image converting unit for converting the print images into images having the same print direction; and a transmitting unit for transmitting the print images and the post-converted images formed by said image converting unit to a printer engine, wherein said image forming system further comprises a control unit for, when judging that said PDL job receiving unit receives the PDL job, forming the print image from the PDL job by use of said print image forming unit, storing the print image in said storage unit, and when judging that said hybrid print demand receiving unit receives the hybrid print demand, making said print direction determining unit determine the same print direction by use of the plurality of print images in said storage unit, converting the print images that are not coincident with the same print direction among the plurality of print images into images having the same print direction by use of said image converting unit, and sending the print images and the post-converted images to said printer engine in the sequence based on the hybrid print demand.

In order to accomplish the fourth object, there is provided an image forming system comprising: a PDL job receiving unit for receiving a PDL job generated by use of a page description language and having a display state related description; a storage unit for storing the PDL job; a hybrid print demand receiving unit for receiving a hybrid print demand for demanding a hybrid print of a plurality of PDL in said storage unit; a print image forming unit for unifying the respective display state related descriptions in the PDL jobs into the same description, and forming the respective print images by interpreting the respective PDL jobs with the unified display state related description; and a transmitting unit for transmitting the print images to a printer engine, wherein said image forming system further comprises a control unit for, when judging that said PDL job receiving unit receives the PDL job, storing the PDL jobs in said storage unit, and when judging that said hybrid print demand receiving unit receives the hybrid print demand, forming a plurality of print images from the plurality of PDL jobs in said storage unit by use of said second print image forming unit, and sending the plurality of print images in the sequence based on the hybrid print demand to said printer engine.

BRIEF DESCRIPTION OF THE DRAWINGS

FIG. 18 is a diagram showing contents of hybrid output information; and

DETAILED DESCRIPTION OF THE INVENTION

First Embodiment

Figure 1:
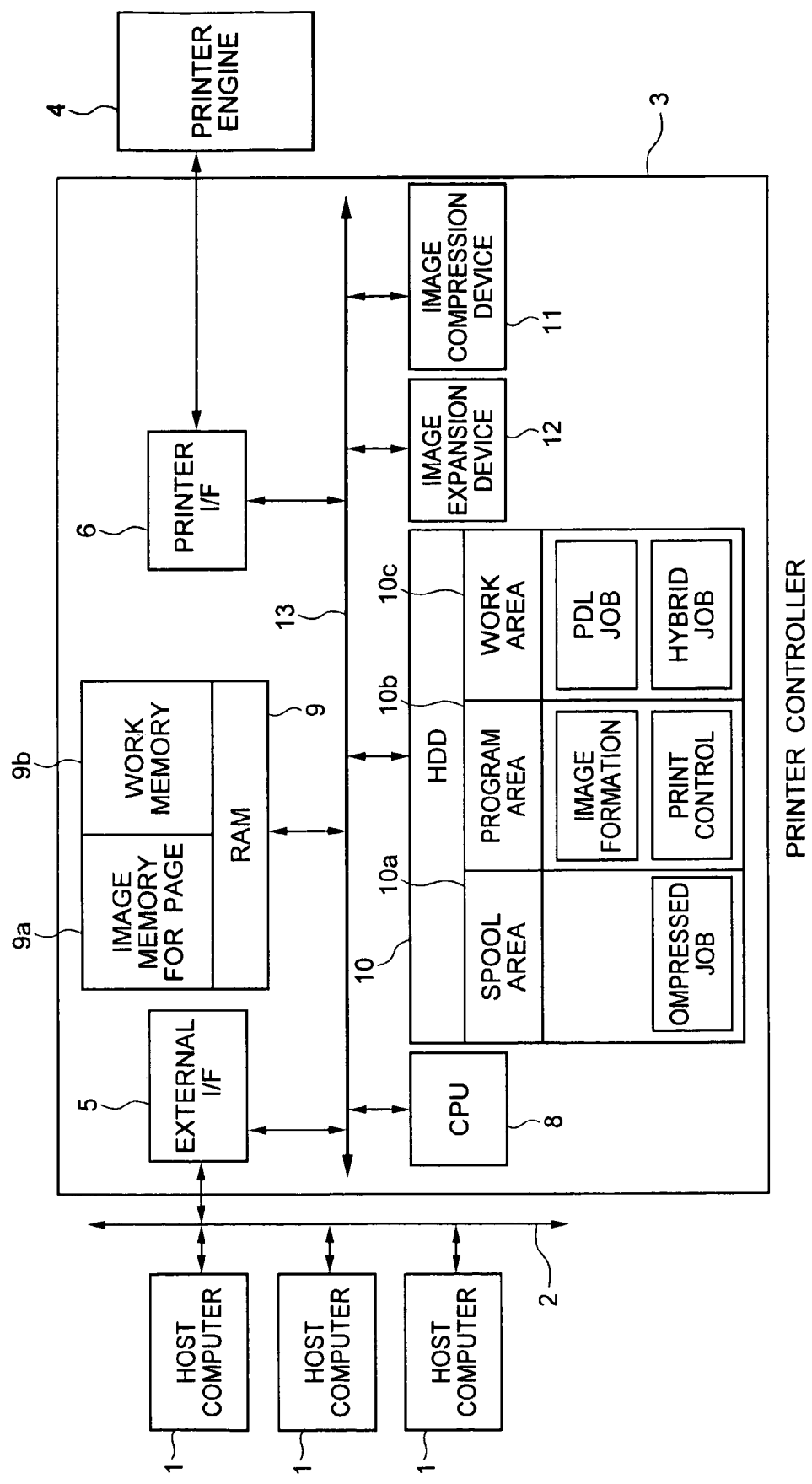
FIG. 1 is a block diagram showing a system configuration of an image forming system in a first embodiment.

FIG. 1 is a block diagram showing a system configuration of an image forming system in a first embodiment.

As shown in FIG. 1, a host computer 1 generates a PDL job (containing PDL page data for a plurality of pages) by use of, e.g., a variety of application software programs. Further, the host computer 1 generates a hybrid print demand containing a hybrid print instruction for instructing the system to perform hybrid printing and hybrid output information for specifying a hybrid print object. The host computer 1 sends the PDL job and the hybrid print demand to a printer controller 3 via a network 2 such as a LAN (Local Area Network), etc.

The printer controller 3 rasterizes and compresses each set of PDL page data of the PDL job received from the host computer 1, and stores each set of compressed raster data as a compressed job. Then, the printer controller 3 generates a hybrid job by use of a single or a plurality of compressed jobs in response to the hybrid print demand given from the host computer 1 (a hybrid job process).

Figure 2:
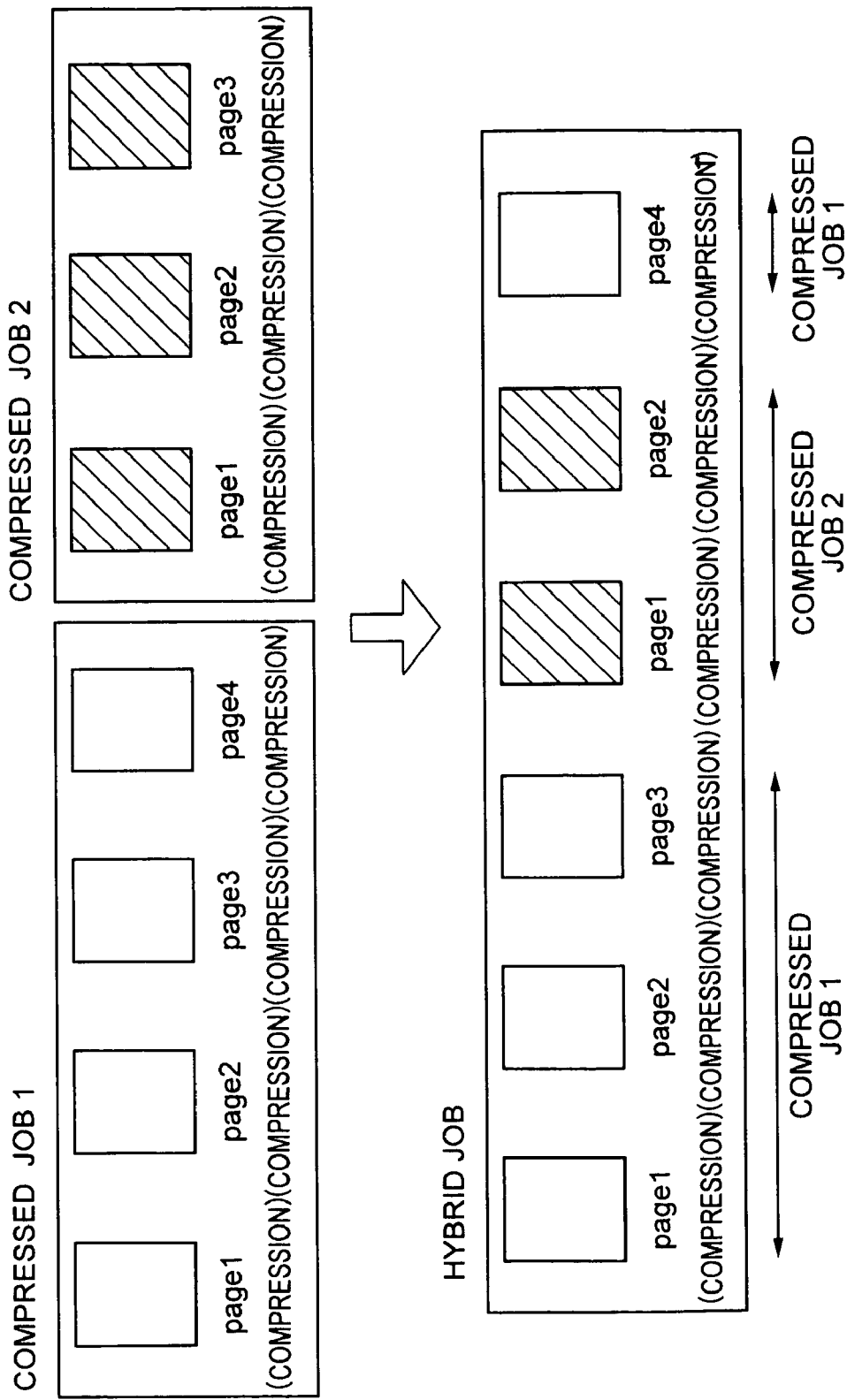
FIG. 2 is a diagram showing an specific example of a hybrid process.

FIG. 2 shows a specific example of the hybrid job process. In this example, pages 1, 2 (compressed raster data 1, 2) of a compressed job 2 are inserted in between pages 3, 4 of a compressed job 1 (compressed data 1 through 4), thus generating one hybrid job. In this example, a page 3 (compressed raster data 3) of the compressed job 2 is deleted.

The print controller, which has generated the hybrid job by the hybrid job process described above, sequentially expands the respective sets of compressed raster data in the hybrid job and sends the thus expanded data to a printer engine 4.

The printer controller 3 will hereinafter be described in greater detail.

The printer controller 3 is connected to the external host computer 1 via an external I/F (Interface) 5. Further, the printer controller 3 is connected to the printer engine 4 via a printer I/F 6. Moreover, the printer controller 3 includes a CPU 8 for executing a variety of processes, a RAM 9 serving as a main storage device, an HDD 10 as an auxiliary storage device, an image compression device 11 for compressing the raster data, and an image expansion device 12 for expanding the compressed raster data. The various categories of hardware resources such as the external I/F 5, the printer I/F 6, the CPU 8, the RAM 9, the HDD 10, the image compression device 11 and the image expansion device 12, are connected to a bus 13 for internal communications and are thereby communicable with each other. The following is more detailed explanations of the CPU 8, the RAM 9, the HDD 10, the image compression device 11 and the image expansion device 12.

The CPU 8 executes a variety of processes by use of an image forming program and a print control program stored in a program area 10b on the HDD 10. The image forming program actualizes a function of converting, into the raster data, each set of PDL page data of the PDL job received from the host computer 1. On the other hand, the print control program actualizes a function of controlling the present image forming system as a whole. The image forming program described above is invoked and is run under this print control program.

The HDD 10 contains a spool area 10a stored with the data of the compressed jobs, etc. The HDD 10 further contains a program area 10b stored with the print control program and the image forming program described above. In addition, the HDD 10 contains a work area 10c serving as a buffer area for work. For example, the work area 10c is used for buffering (temporarily storing) the PDL job received from the host computer 1 and buffering the hybrid job which will be explained later on.

The RAM 9 includes a page-oriented image memory 9a used as a work area when converting each set of PDL page data of the PDL job into the raster data. The RAM 9 further includes a work memory 9b into which a variety of programs are loaded from the program area 10b on the HDD 10. For instance, the CPU 8 loads the image forming program into the work memory 9 and executes this program, thereby converting each set of PDL page data of the PDL job into the raster data. In addition, the work memory 9b is utilized as a buffer area for work.

The image compression device 11 captures and compresses each set of raster data developed on the page-oriented image memory 9a. The respective compressed sets of raster data (the compressed raster data) are assembled into one compressed job and are thereafter stored, in a state of being attached with attribute information that will hereinafter be described, in the spool area 10a.

The image expansion device 12 sequentially expands the respective sets of compressed raster data of the compressed job stored in the spool area 10a, thereby restoring them into the respective sets raster data. The restored raster data are sent to the printer engine 4 via the printer I/F 6.

The printer controller 3 explained so far is provided, together with the printer engine 4 that will be described later on, in a body of the system. As a matter of course, the printer controller 3 may, however, be provided as an external controller 3 outside the system body.

The printer engine 4 receives the raster data from the printer I/F 6 and forms a visible image on the sheet by use of the raster data. The printer engine 4 includes, for example, a sheet feeding unit for supplying the sheets, a printing unit for forming a toner image on the sheet supplied from the sheet feeding unit by use of the raster data, a fixing unit for fixing the toner image formed on the sheet onto this sheet by heating and pressurizing it.

Next, a processing procedure by the CPU 8 using the print control program described above will be explained.

Figure 3:
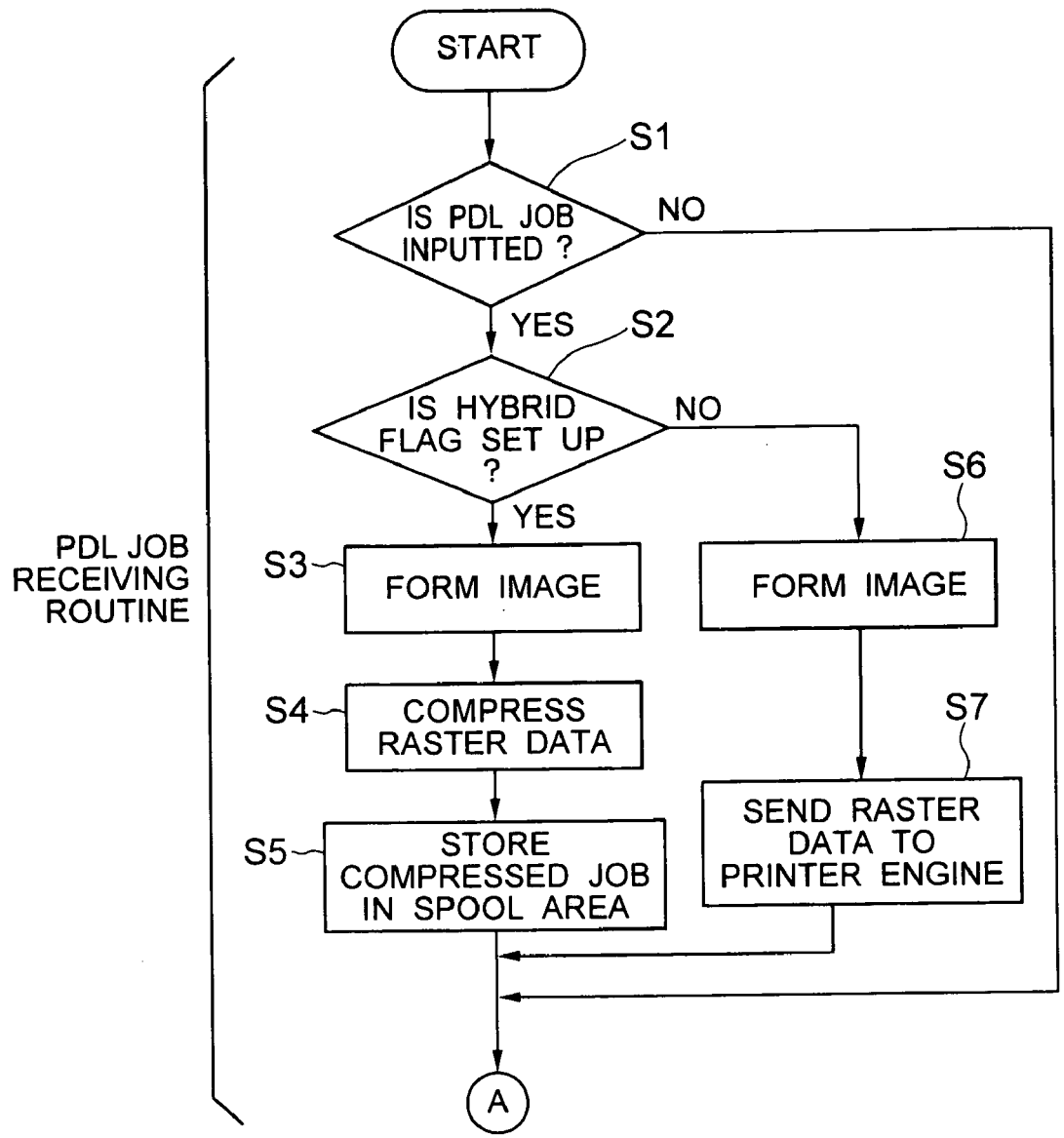
FIG. 3 is an explanatory flowchart showing a processing procedure by a CPU in the first embodiment.
Figure 4:
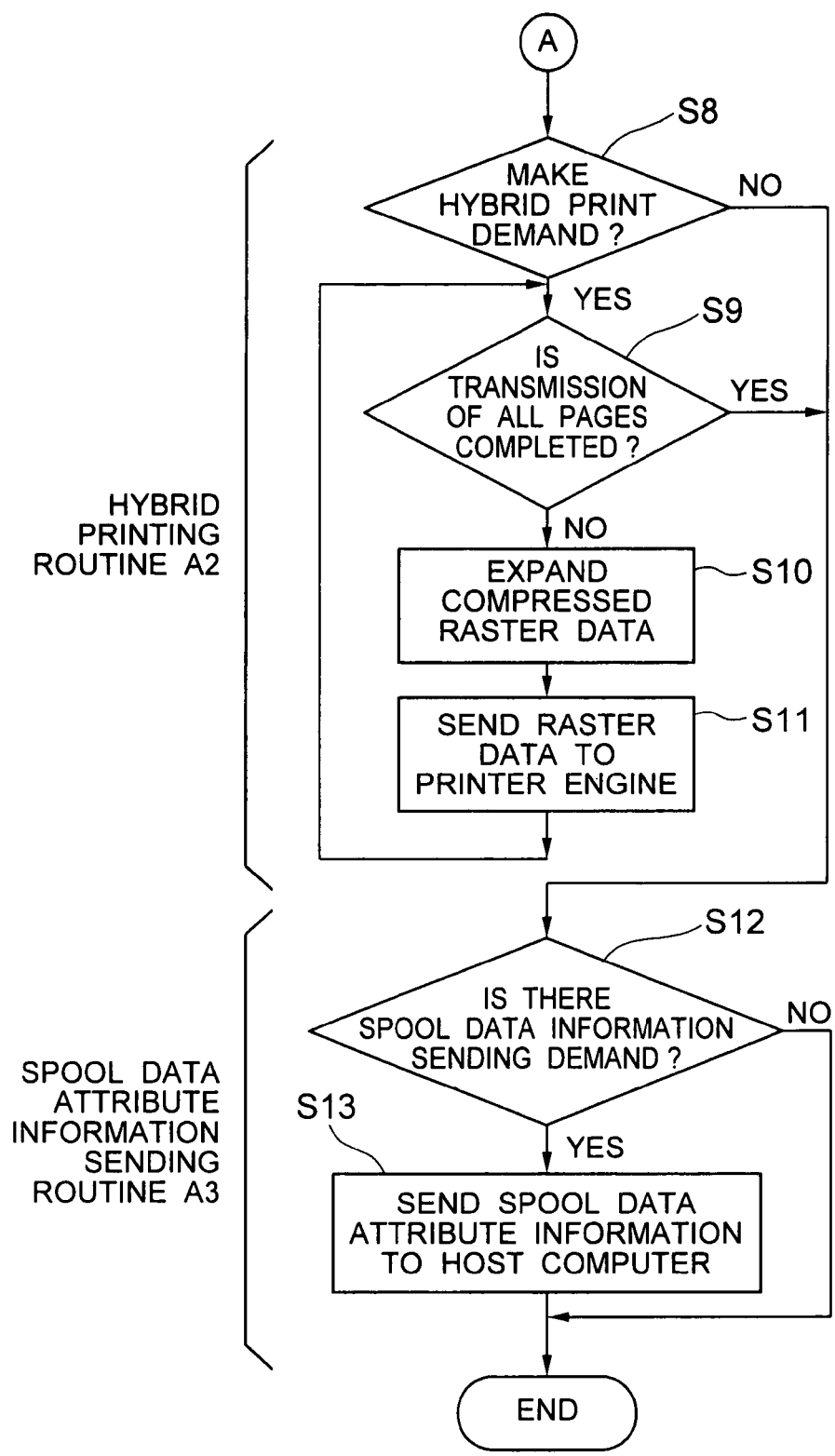
FIG. 4 is a flowchart showing steps subsequent to those in FIG. 3.

FIGS. 3 and 4 are flowcharts showing the processing procedure executed by the CPU 8.

This processing procedure consists of a PDL job receiving routine A1 (see FIG. 3), a hybrid printing routine A2 (see FIG. 4) and a spool data attribution information sending routine A3 (see FIG. 4). The CPU 8 periodically loads the print control program stored in the program area 10b described above into the work memory 9b on the print controller 3 and executes this program. The CPU 8 executes, however, any one of the routines A1 through A3 at every run-time of the print control program. For example, if the CPU 8 judges "Yes" in step S1 in FIG. 3, i.e., when an execution of the routine A1 is started, the CPU 8 judges "No" in both of steps S8 and S12 in FIG. 4, and therefore neither the routine A2 nor the routine A3 is executed.

This processing procedure will be explained in depth with reference to FIGS. 3 and 4.

To start with, the PDL job receiving routine A1 will be described referring to FIG. 3. This PDL job receiving routine A1 is a routine executed when the printer controller 3 receives the PDL job from the host computer 1. The following is a more detailed discussion.

At first, as shown in step S1 in FIG. 3, the CPU 8 judges whether the external I/F 5 receives the PDL job (containing the PDL page data for a plurality of pages) from the host computer 1.

The CPU 8, when judging that the external I/F 5 does not receive the PDL job (No in step S1), terminates this routine. Whereas if the CPU 8 judges that the external I/F 5 receives the PDL job (Yes in step S1), buffers the PDL job in the work area 10c on the HDD 10 (step S2). Then, the CPU 8 judges whether a hybrid print discrimination flag contained in the PDL job is set up or not (step S2). This hybrid print discrimination flag represents whether the PDL job concerned is a hybrid print target or not, and is generated by a printer driver in the host computer when generating the PDL job.

The CPU 8, when judging that the hybrid print discrimination flag in the PDL job is set up (Yes in step S2), loads the image forming program stored in the program area 10b on the HDD 10 into the work memory 9b on the RAM 9 (step S3). Then, the CPU 8 converts each set of PDL page data of the PDL job into the raster data by use of the loaded image forming program (step S3).

The CPU 8, upon generating the raster data, compresses each set of raster data with the aid of the image compression device 11, thereby generating the compressed raster data (step S4).

The CPU 8, which has thus generated the compressed raster data, assembles the respective sets of compressed raster data into one compressed job, then attaches pieces of attribute information such as job identifying information, a page count, etc. to this compressed job, and thus stores the compressed job containing the attribute information in the spool area 10a (step S5). It is herein assumed that the compressed jobs 1 and 2 shown in FIG. 2 be stored in the spool area 10a. Thereafter, the PDL job in the work area 10c is deleted (step S5).

Whereas if the CPU 8 judges that the hybrid print discrimination flag in the PDL job is not set up (No in step S2), the CPU 8 converts the PDL page data of the PDL job into the raster data by use of the image forming program (step S6).

The CPU 8, upon generating the raster data, sends the raster data to the printer engine 4 via the printer I/F 6 (step S7). Thereafter, the printer engine 4 executes a printing process by utilizing the raster data (step S7).

Next, the hybrid printing routine A2 will be discussed referring to FIG. 4.

This hybrid printing routine A2 is a routine for executing a hybrid printing process when the printer controller 3 receives a hybrid print instruction and a piece of hybrid output information (a hybrid print demand) from the host computer 1. The following is a description in much greater detail.

To being with, the CPU 8 judges whether or not the external I/F 5 receives the hybrid print instruction and the hybrid output information from the host computer 1 (step S8). The hybrid output information contains descriptions (information) of, e.g., a compressed job name of a hybridizing target job, a hybridizing method, etc. The information (such as the compressed job name and a page count of this job) about the hybridizing target compressed job, is obtained by the host computer 1 in the routing A3 as will be explained later on.

The CPU 8, when judging that the external I/F 5 does not receive the hybrid print instruction and the hybrid output information (No in step S8), terminates this routine. The CPU 8, whereas if judging that the external I/F 5 receives the hybrid print instruction and the hybrid output information (it is herein assumed that the hybrid print instruction that demands the hybrid process shown in FIG. 2 and the hybrid output process be received) (Yes in step S8), executes the following process. To be specific, at first, the compressed jobs 1, 2 in FIG. 2 are hybridized based on the hybrid output information, thereby generating a hybrid job (see FIG. 2) (step S9). Then, the CPU 8 expands a head page (a page 1 of the compressed job 1) of the hybrid job by use of the image expansion device 12 (step S10), and sends the expanded data to the printer engine 4 (step S11). The pages (a page 2 of the compressed job 1, pages 1, 2 of the compressed job 2 and a page 4 of the compressed job 1) from the next onwards are similarly expanded in sequence and sent to the printer engine 4 (steps S9, S10, S11). Note that the page 3 of the compressed job 2 is not, as shown in FIG. 2, set as a hybrid print target. After the above steps (S9, S10, S11) have been executed for all the pages of the hybrid job (Yes in step S9), the CPU 8 terminates this routing A2.

Next, the spool data attribute information sending routing A3 will be discussed with reference to FIG. 4.

This spool data attribute information sending routine A3 is a routine for sending, when the printer controller 3 receives a spool data information sending demand from the host computer 1, pieces of attribute data (such as, a compressed job name, a page count, etc.) of each compressed job which are stored in the spool area 10a. A detailed explanation thereof will be give as follows.

To start with, the CPU 8 judges whether or not the spool data information sending demand is received from the host computer 1 (step S12).

The CPU 8, when judging that the spool data information sending demand is not received (No in step S12), terminates this routine A3. The CPU 8, whereas if judging that the spool data information sending demand is received (Yes in step S12), sends the attribute data of the respective compressed jobs that are stored in the spool area 10a to the host computer 1 defined as a demand originator (step S13).

As discussed above, according to the first embodiment, the raster data having a large data size are compressed and thus stored, and hence even a small-capacity storage device is capable of storing a larger number of jobs. It is therefore possible to easily actualize the hybrid print targeting a multiplicity of jobs.

Second Embodiment

A second embodiment is actualized by adding, to the hybrid printing process exemplified in the first embodiment, a process of automatically determining a sheet output direction, i.e., a sheeting printing direction.

Given first is an explanation of a concept of this process of automatically determining the sheet output direction (sheet output direction auto-determining process).

Figure 5:
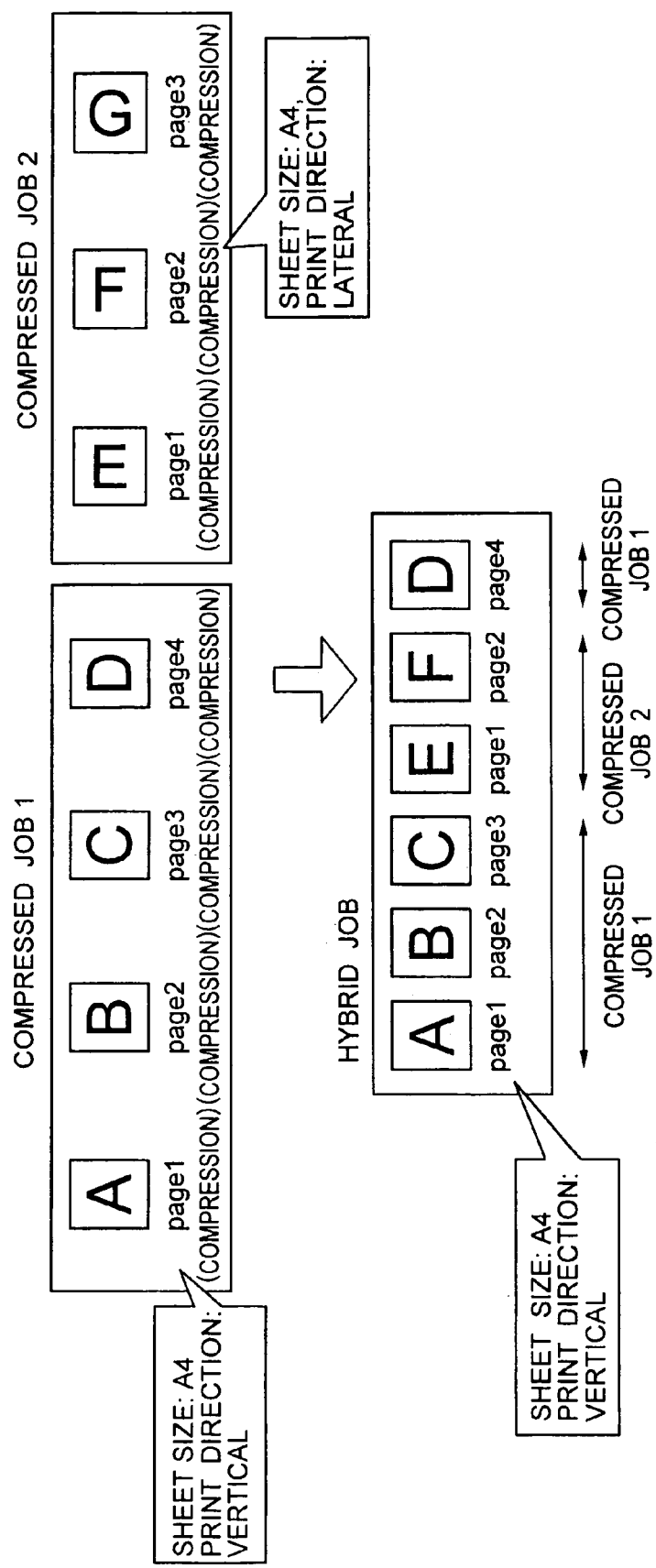
FIG. 5 is a diagram showing a specific example in which a sheet output direction changing process is applied to a hybrid print.

FIG. 5 is a diagram showing an example of the hybrid printing process using the sheet output direction auto-determining process.

As shown in FIG. 5, in this hybrid printing, the pages 1 through 4 (the compressed raster data 1 through 4) of the compressed job and the pages 1, 2 (the compressed raster data 1, 2) of the compressed job 2 are hybrid-printed. Herein, an output direction of the compressed job 1 is a vertical direction (a long-edge direction), while an output direction of the compressed job 2 is a lateral direction (a short-edge direction). Accordingly, when executing the hybrid printing process, it is required that the output directions be unified in any one of the vertical and lateral directions. This is because the sheet output directions need unifying in the case of executing, e.g., a staple process, etc. As explained, however, the change in the sheet output direction causes a decline of an image quality of the sheet with its output direction changed. The reason for this is that the raster data, i.e., each set of compressed raster data of the compressed job undergo a gradation process taking the sheet output direction into consideration. Such being the case, according to the second embodiment, the number of sheets of which the output direction should be rotated is decreased on the whole by setting a job having a smaller print page count as an output direction rotating target to the greatest possible degree, thereby reducing the decline of the image quality. To be specific, as shown in FIG. 5, the output direction (the lateral direction) of the sheets of the compressed job 2 defined as a job having the smaller print page count is rotated through 90 degrees, thus setting the output direction vertical. Then, the compressed job 2 set in the vertical direction is hybridized with the compressed job 1, thereby generating a hybrid job.

Next, a processing procedure built up by adding the sheet output direction determining process to the processing procedure used in the first embodiment, will be discussed.

Figure 6:
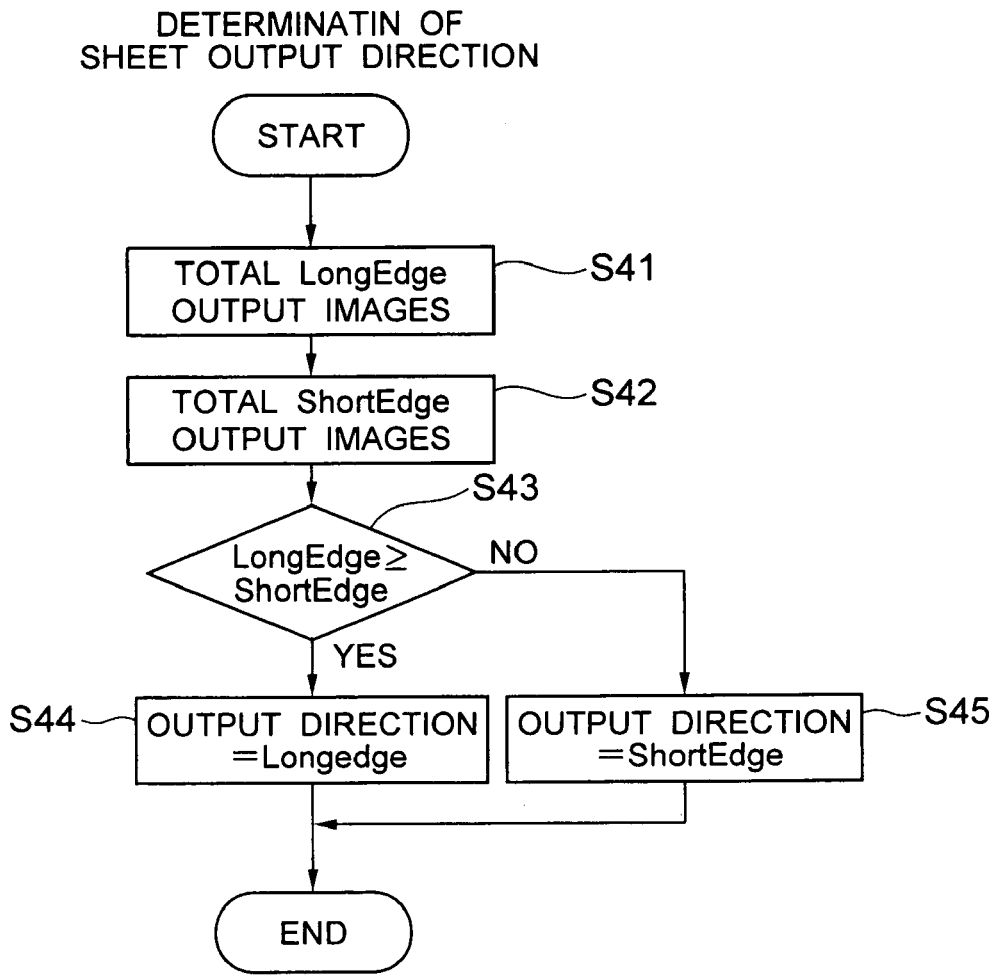
FIG. 6 is a flowchart showing details of a sheet output direction determining routine.

A flowchart in this built-up processing procedure is substantially the same as the flowchart (FIGS. 3 and 4) used in the first embodiment with the exception that a sheet output direction determining routine is added just posterior to the hybrid print demand step S8 in the hybrid printing routine A2 in FIG. 4. FIG. 6 shows detailed steps of the sheet output direction determining routine added afresh.

This routine schemes to gain a total of a page count of the long-edge output pages (vertical output pages) and a page count of short-edge output pages (lateral output pages) by use of each of the compressed jobs (see FIG. 5) to be hybridized. Then, the direction exhibiting a larger page count is determined as the output direction. A much greater discussion will be made as follows.

To start with, the CPU 8 (see FIG. 1), when judging that the external I/F 5 receives the hybrid print instruction and the hybrid output information from the host computer 1 (see step S8 in FIG. 4), totals the long-edge output page count by use of each of the compressed jobs of which the pages are hybrid-printed (step S41). In the example shown in FIG. 5, the compressed job 1 is set to the long-edge output (vertical direction output), and hence the total page count is 4.

Next, the CPU 8 totals the short-edge output page count in the same way as above (step S42). In the example shown in FIG. 5, the compressed job 2 is set to the short-edge output (the lateral direction output), and therefore the total page count is 2 (the page 3 is, as explained above, not the hybrid print target page).

Next, the CPU 8 compares the page count of the long-edge output pages with the page count of the short-edge output pages, which are calculated in steps S41 and S42 (step S43).

The CPU 8, when judging that the page count of the long-edge output pages is equal to or larger than the page count of the short-edge output pages (Yes in step S43), determines that the sheet output direction is the long-edge output direction, and generates a hybrid job that unifies the sheet output directions into the long-edge output direction. This step is applied to the example shown in FIG. 5, wherein the output direction of the compressed job 2 is changed to the long-edge output, and a hybrid job that unifies the sheet output directions into the long-edge output direction is generated by use of this compressed job 2 and the compressed job 1.

On the other hand, the CPU 8, when judging that the page count of the long-edge output pages is smaller than the page count of the short-edge output pages (No in step S43), determines that the sheet output direction is the short-edge output direction, and generates a hybrid job that unifies the sheet output directions into the short-edge output direction (step S45).

After thus generating the hybrid job that unifies the sheet output directions, as in the first embodiment, the CPU executes subsequent step S9 (see FIG. 4).

As discussed above, according to the second embodiment, on the occasion of hybridizing the plurality of compressed jobs, the page count of the long-edge output pages and the page count of the short-edge output pages are counted, and the output direction of the pages exhibiting the larger page count is determined as the sheet output direction, whereby the page count of the pages with the output direction to be changed can be decreased. Hence, the decline of the image quality due to change in the output direction can be reduced to the greatest possible degree.

Third Embodiment

A third embodiment schemes to execute hybrid-printing the PDL job given from the host computer 1 and image data given from a scanner and a FAX. Rasterization of the image data given from the scanner and the FAX is characterized such that the rasterization is done at the hybrid-printing time. The third embodiment will hereinafter be described in depth.

Figure 7:
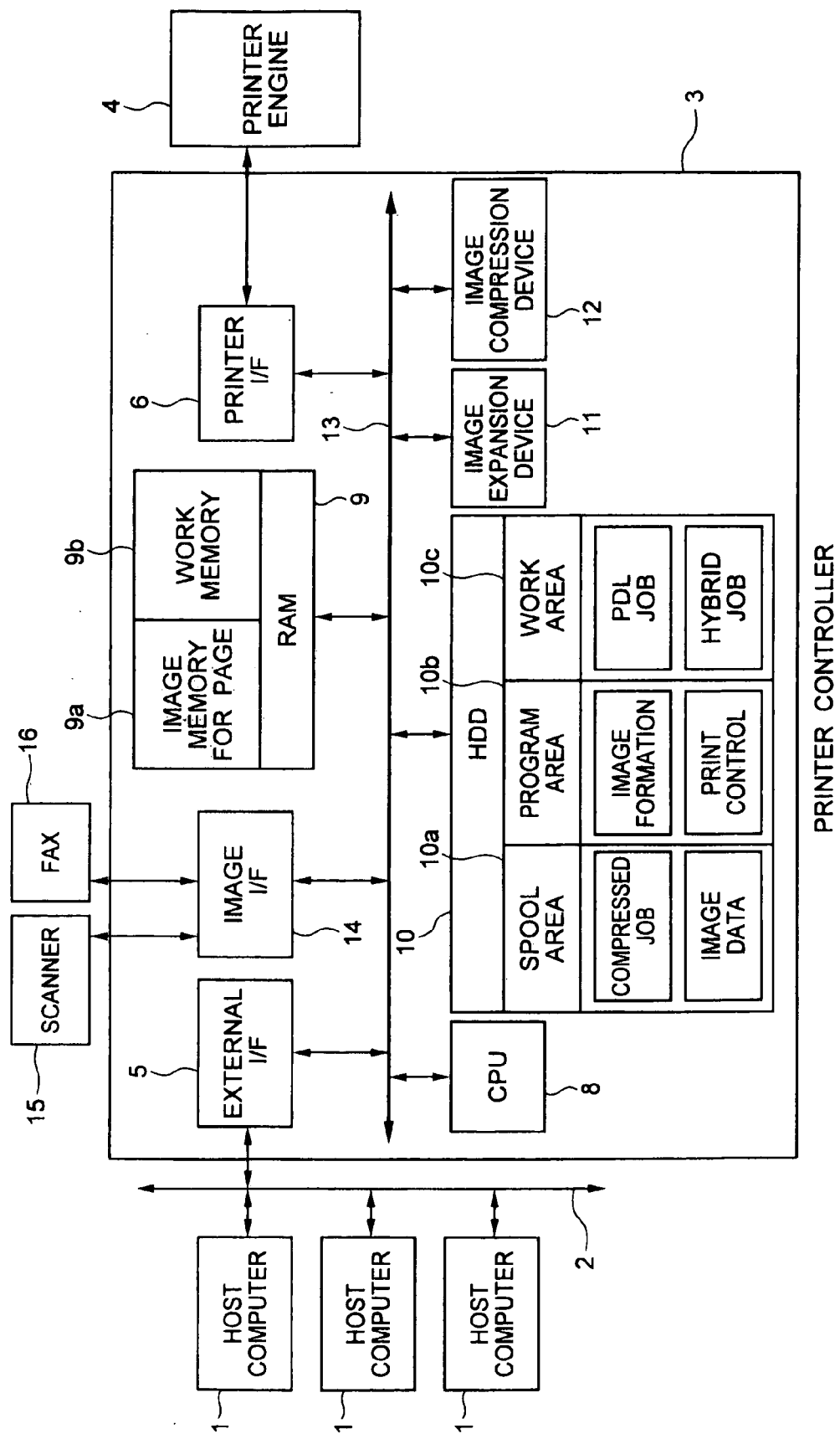
FIG. 7 is a block diagram showing a system configuration of the image forming system in a third embodiment.

FIG. 7 is a block diagram showing a system configuration of the image forming system in the third embodiment.

As illustrated in FIG. 7, a scanner 15 and a FAX 16 are connected an image I/F 14 to a bus 13 in the printer controller 3. The program area 10b on the HDD 10 is stored with a print control program for actualizing the third embodiment that will be explained later on. On the other hand, the spool area 10a is stored with image data received by the image I/F 14 from the scanner 15 and the FAX 16. These pieces of image data are based on, e.g., a JPEG (Joint Photographic Experts Group) format. As a matter of course, the image data format may be other types of image formats if supported by PDL (Page Description Language). The image data are stored in an as-is state (e.g., the JPEG-formatted state) up to before the hybrid printing process and are, as will be described later on, PDL-formatted and rasterized when executing the hybrid printing process. Hence, the host computer 1 can obtain and use the image data in the spool area 10a up to before the hybrid printing process (and even after this process if not deleted when executing the hybrid printing process).

Figure 8:
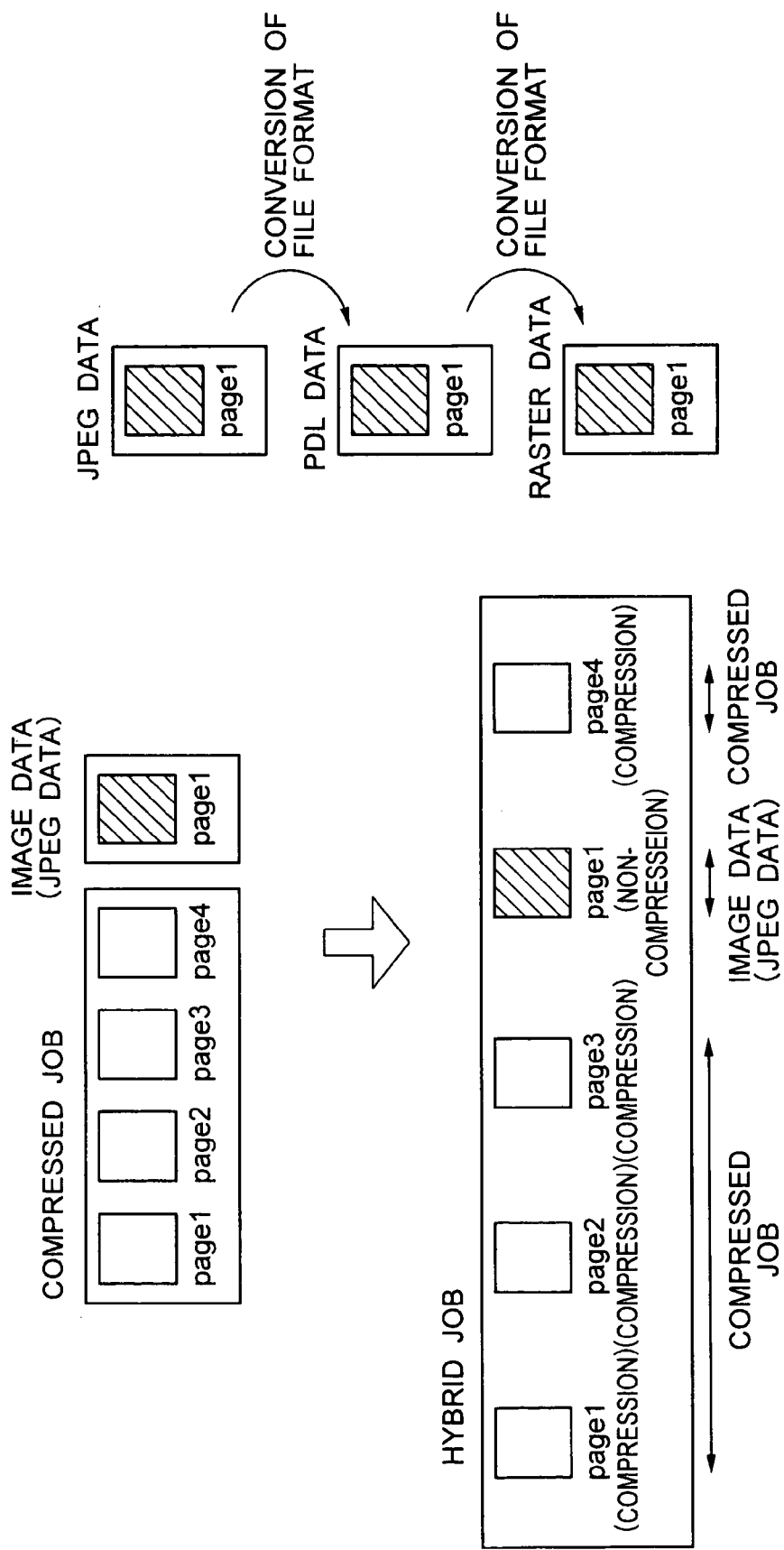
FIG. 8A is a diagram showing a state where compressed raster data are hybridized with JPEG data.
FIG. 8B is a diagram showing a file converting routine from the JPEG data into raster data.

FIG. 8A is a diagram showing an example of a process of hybridizing the compressed job with JPEG data.

As shown in FIG. 8A, a compressed job (pages 1 through 4) is hybridized with image data (JPEG data) given from the scanner 15, thereby generating a hybrid job. The thus generated hybrid job is stored in the work area 10c. the respective pages of this hybrid job are, as in the first embodiment, expanded sequentially from the head page back into the raster data and thus sent to the printer engine 4. The fourth JPEG data from the head is converted into the raster data as illustrated in FIG. 8B showing a data conversion step into the raster data from the JPEG data. To be specific, as shown in FIG. 8B, the JPEG data is converted at first into PDL page data, and thereafter the PDL page data is rasterized.

Next, a processing procedure by the CPU 8 using the print control program in the third embodiment will be explained.

Figure 9:
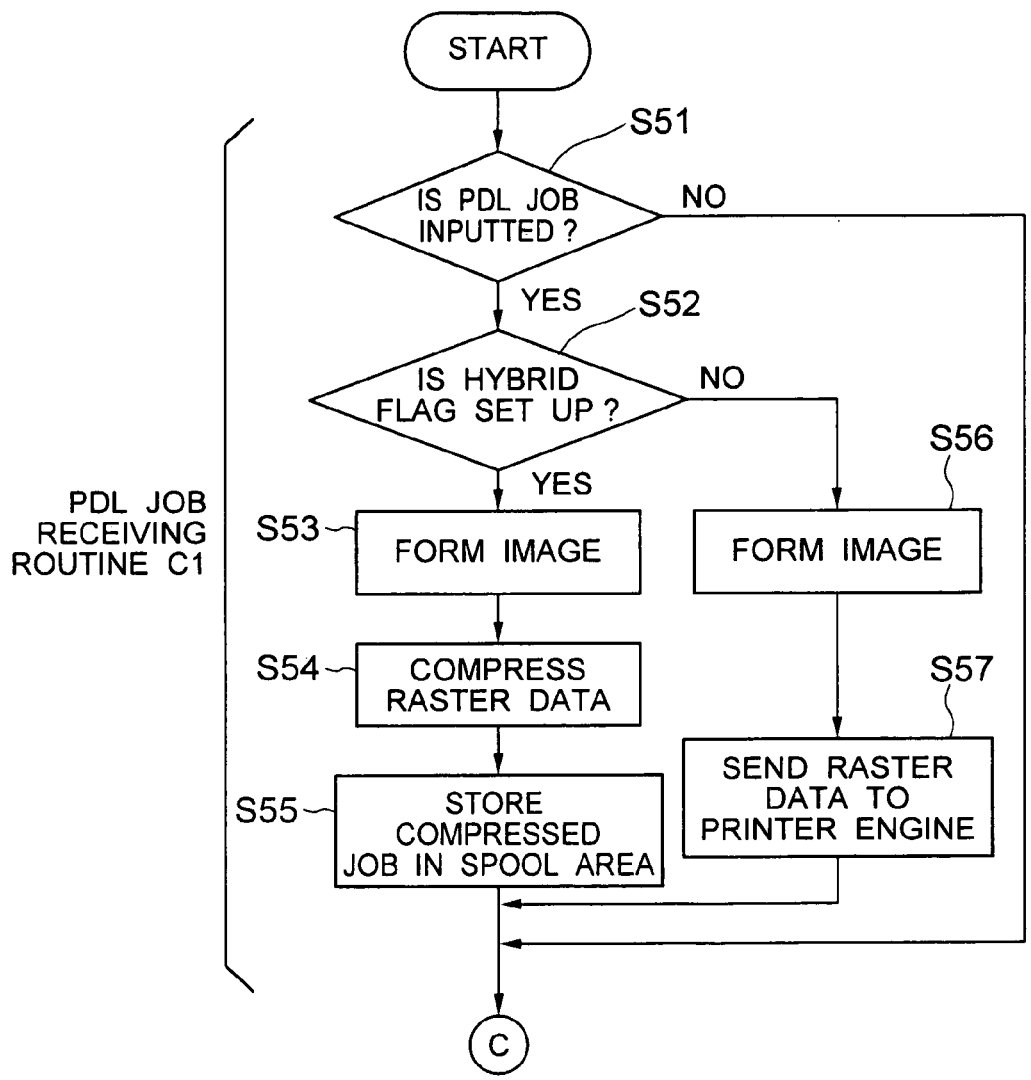
FIG. 9 is a flowchart showing a processing procedure by the CPU in the third embodiment.
Figure 10:
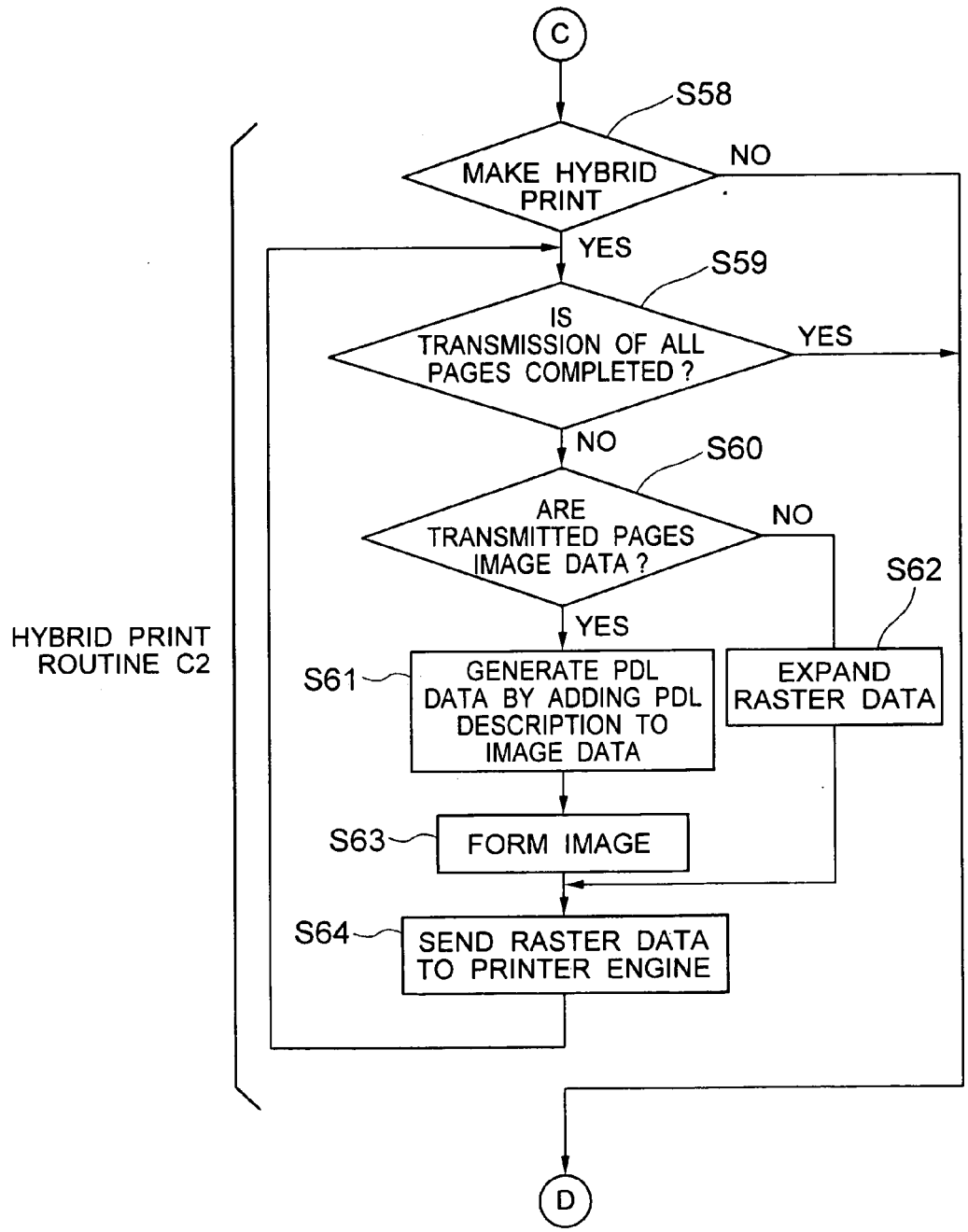
FIG. 10 is a flowchart showing steps subsequent to those in FIG. 9.
Figure 11:
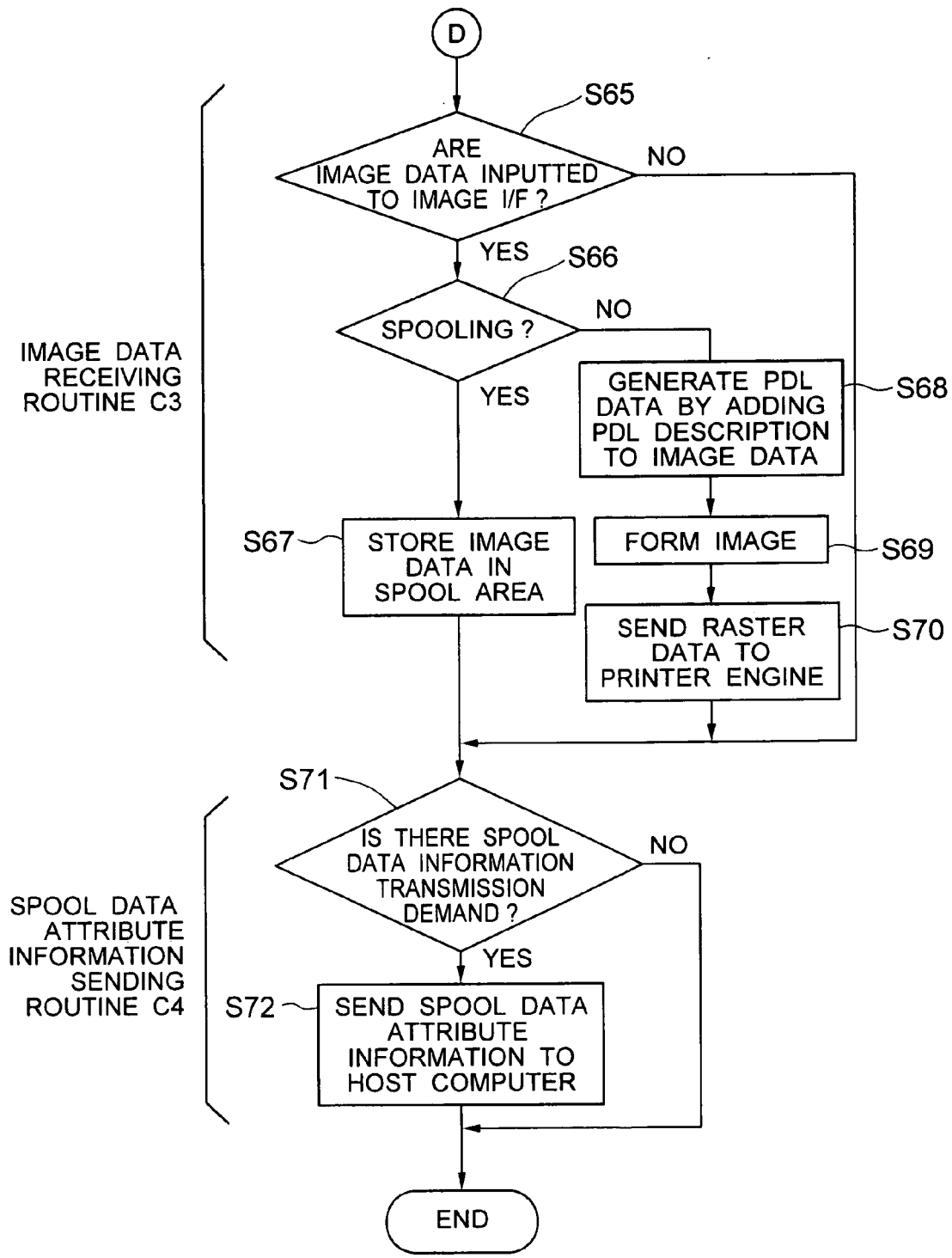
FIG. 11 is a flowchart showing steps subsequent to those in FIG. 10.

FIGS. 9, 10 and 11 are flowcharts showing this processing procedure.

Steps of this processing procedure are categorized into a PDL job receiving routine C1 (see FIG. 9), a hybrid printing routine C2 (see FIG. 10), an image data receiving routine C3 (see FIG. 11) and a spool data attribute information sending routine C4 (see FIG. 11). Different points of this processing procedure from the processing procedure in the first embodiment are a difference of a part of the contents of the hybrid printing routine C and a new addition of the image data receiving routine C3. The hybrid printing routine C2 and the image data receiving routine C3 will hereinafter be described in detail.

The discussion starts with explaining the image data receiving routine C3 with reference to FIG. 11 and subsequently deals with the hybrid printing routine C2 with reference to FIG. 10.

The image data receiving routine C3 shown in FIG. 11 is a routine for, when an image I/F 14 receives the image data from the scanner 15 or the FAX, storing the same received image data in the spool area 10*a*, and so on. The following is a description in greater detail.

At first, as shown in step S65 in FIG. 11, the CPU 8 judges whether the image I/F 14 receives the image data from the scanner 15 or the FAX 16 (step S65).

The CPU 8, when judging that the image I/F 14 does not receive the image data (No in step S65), terminates this routine C3.

While on the other hand, the CPU 8, when judging that the image I/F 14 receives the image data (Yes in step S65), confirms a spooling mode set in the image I/F 14 (step S66). This spooling mode is a mode for determining whether the inputted image data should be stored or not, and is set by an instruction given to the image I/F 14 from a control panel of the scanner 15 or the FAX 16.

The CPU 8, when judging that the spooling mode set in the image I/F 14 is "store" (Yes in step S66), stores the spooling area 10*a* with the image data received by the image I/F 14 (step S67).

The CPU 8, whereas if judging that the spooling mode set in the image I/F 14 is "non-store" (No in step S66), executes steps that follow. Namely, at first, the CPU 8 removes a header and a footer attached to the image data, and subsequently adds a PDL description, thereby generating PDL page data (step S68). The CPU 8 having generated the PDL page data converts the PDL page data into the raster data on the basis of the image forming program stored in the program area 10*b* (step S69) and sends the raster data to the printer engine 4 (step S70).

Next, the hybrid printing routine C2 will be explained referring to FIG. 10.

This hybrid printing routine C2 is a routine for performing the hybrid print by use of the image data and the compressed jobs in the spool area 10*a* (see FIG. 7) when the external I/F 5 receives the hybrid print demand from the host computer 1. A more detailed explanation is given as follows.

As shown in step S58 in FIG. 10, the CPU 8, when judging that the I/F 5 has received the hybrid print demand from the host computer 1 (Yes in step S58), generates a hybrid job by use of the compressed jobs and the image data (see a lower part in FIG. 8A) (step S59).

The CPU 8 having generated the hybrid job judges whether the head page of the hybrid job is categorized as the compressed raster data or the image data (step S60).

The CPU 8, when judging that the head page of the hybrid job is the image data (Yes in step S60), as in the case of the image data receiving routine C3, removes the header and the footer from the image data and adds a PDL description afresh, thereby generating PDL page data (step S61). The CPU 8 rasterizes the generated PDL page data on the basis of the image forming program in the program area 10*b* (step S63), and sends the rasterized data to the printer engine 4 (step S64).

While on the other hand, the CPU 8, when judging that the head page of the hybrid job is not the image data, i.e., judging that the head page is the compressed raster data (No in step S60), expands the compressed raster data by using the image expansion device 11 (step S62), and sends the expanded data to the printer engine 4 (step S64).

The CPU 8, after executing the routine (steps S61 through S64) described above for all the pages of the hybrid job (Yes in step S59), terminates this routine C2.

As discussed above, according to the third embodiment, the image data from the scanner 15 or the FAX 16 are stored as they are without being rasterized up to before the hybrid printing. Therefore, the image data from the scanner 15 or the FAX 16 are easily utilized for applications other than printing, e.g., in the host computer 1.

Fourth Embodiment

A scheme of a fourth embodiment is a hybrid print of the PDL job given from the host computer 1 and of an image given from the scanner 15 of the FAX 16 and formed in a format that is not supported by PDL. Namely, according to the third embodiment, the hybrid print with the PDL job is carried out by use of the image data (e.g., the JPEG data) supported by PDL. The fourth embodiment, however, schemes to perform the hybrid print with the PDL job by using the image data that are not supported by PDL.

A processing procedure by the CPU 8 in the fourth embodiment is substantially the same as the processing procedure (consisting of the PDL job receiving routine C1, the hybrid printing routine C2, the image data receiving routine C3 and the spool data attribute information sending routine C4 (see FIGS. 9 through 11) in the third embodiment. A difference of the fourth embodiment is an addition of an image format converting routine to each of the hybrid printing routine C2 and the image data receiving routine C3 in the third embodiment. Such being the case, the hybrid printing routine (a hybrid printing routine C2') and the image data receiving routine (an image data receiving routine C3') will hereinafter be described.

Figure 12:
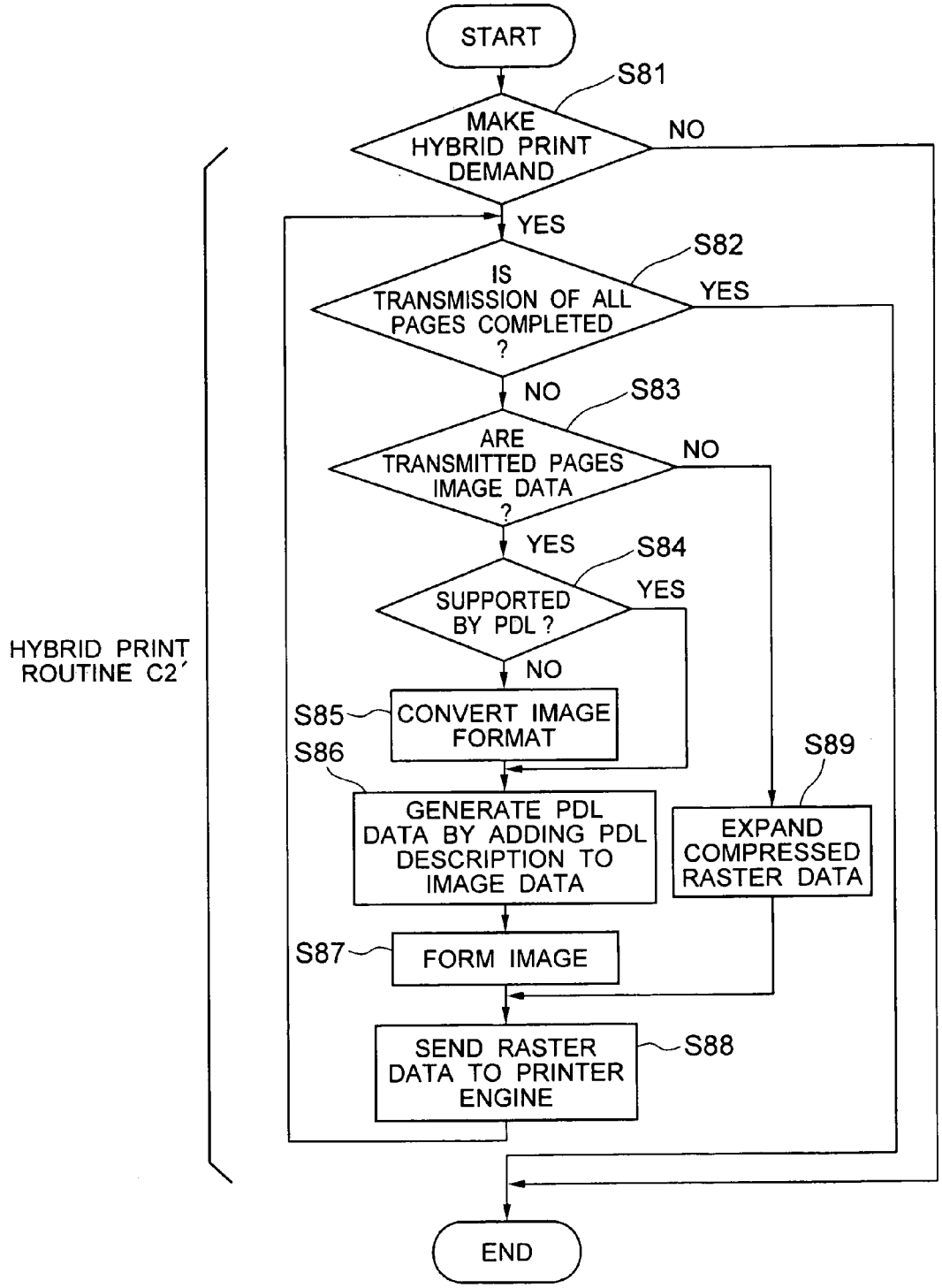
FIG. 12 is a flowchart showing a hybrid print procedure by the CPU in a fourth embodiment.
Figure 13:
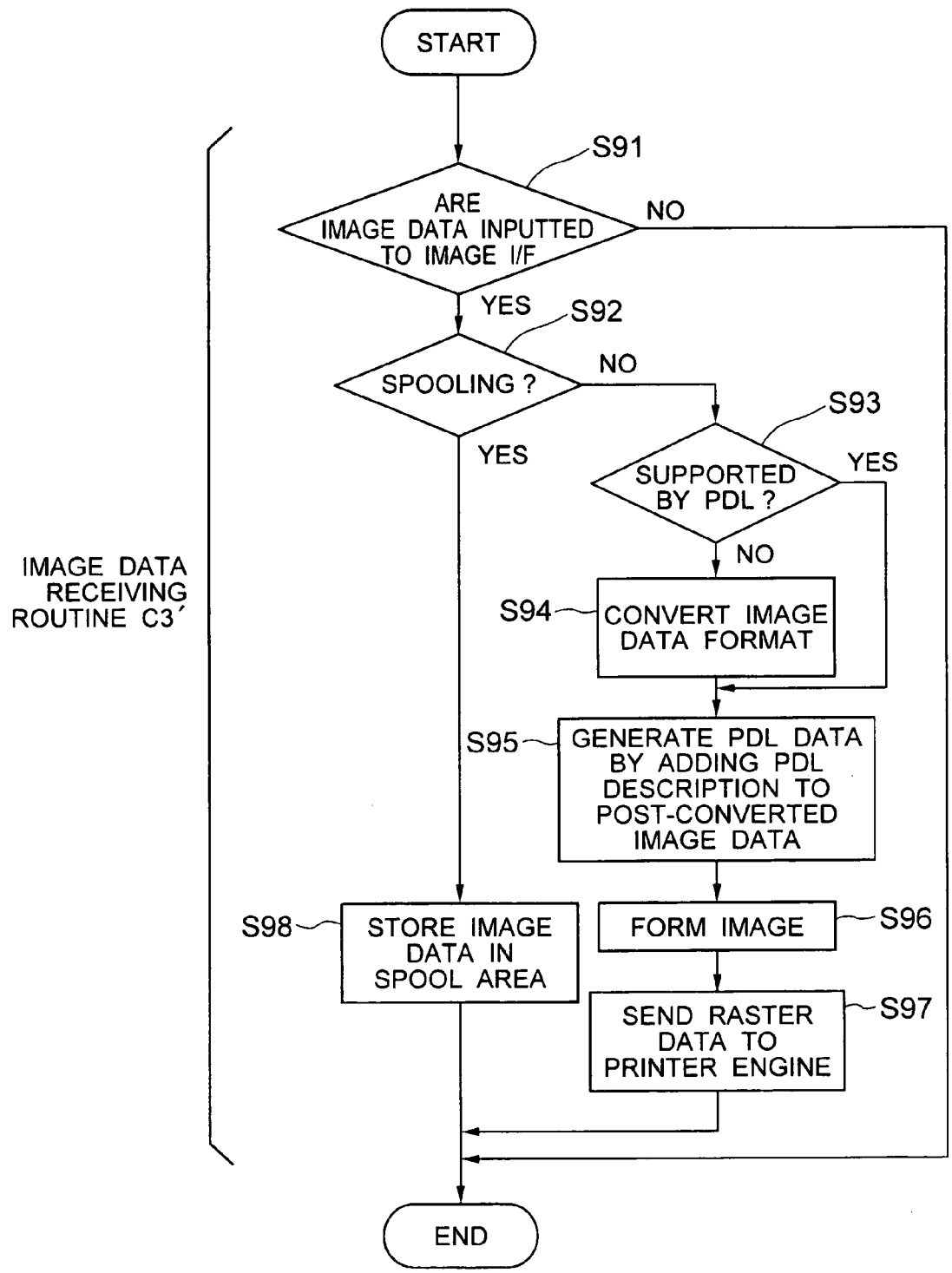
FIG. 13 is a flowchart showing an image data receiving procedure by the CPU in the fourth embodiment.

The discussion starts with explaining the image data receiving routine C3' with reference to FIG. 13 and thereafter deals with the hybrid printing routine C2' with reference to FIG. 12.

FIG. 13 is a flowchart showing the image data receiving routine C3'.

This image data receiving routine C3' is a routine executed when the image I/F 14 receives the image data that are not supported by PDL from the scanner 15 or the FAX16. The following is a more detailed description thereof.

As in the third embodiment, to start with, the CPU 8 judges whether or not the image I/F 14 receives the image data from the scanner 15, etc. (step S91).

The CPU 8, when judging that the image I/F 14 does not receive the image data from the scanner 15, etc. (No in step S91), terminates this routine C3'.

While on the other hand, the CPU 8, when judging that the image I/F 14 receives the image data from the scanner 15, etc. (Yes in step S91), confirms the spooling mode set in the image I/F 14.

The CPU 8, when judging that the spooling mode is set "non-store" (No in step S92), executes the following routine.

Namely, the CPU 8 judges whether the format of the same image data is supported by PDL or not (step S93).

The CPU 8, when judging that the image data format is not supported by PDL (No in step S93), converts the image data into a format (e.g., the JPEG format) supported by PDL (step S94). The steps subsequent thereto are the same as those in the image data receiving routine C3. To be specific, the CPU 8 removes a header and a footer attached to the image data converted into the PDL-supported format, and adds a PDL description, thereby generating PDL page data (step S95). The CPU 8 having generated the PDL page data converts the PDL page data into the raster data on the basis of the image forming program (step S96) and sends the raster data to the printer engine 4 (step S97).

The CPU 8, whereas if judging that the image data format is the PDL-supported format (Yes in step S93), generates the raster data without converting the image data format (steps S95, S96), and sends the raster data to the printer engine 4 (step S97).

On the other hand, the CPU 8, when judging in step S92 that the spooling mode is set to "store" (Yes in step S92), stores the spool area 10a with the image data given from the scanner 15, etc. (step S98).

Next, the hybrid printing routine C2' will be explained referring to FIG. 12.

This hybrid printing routine C2' is a routine for performing the hybrid print by use of the image data, etc. that are not supported by, for instance, PDL.

At first, as in the third embodiment, the CPU 8 judges whether or not the external I/F 5 receives the hybrid print demand from the host computer 1 (step S81).

The CPU 8, when judging that the external I/F 5 does not receive the hybrid print demand (No in step S81), terminates this routine C2'.

While on the other hand, the CPU 8, when judging that the I/F 5 has received the hybrid print (Yes in step S81), generates a hybrid job by use of the compressed jobs and the image data in the spool area 10a (step S82) (see FIG. 8A).

Next, The CPU 8 judges whether the head page of the hybrid job is categorized as the image data or not (step S83).

The CPU 8, when judging that the head page of the hybrid job is not the image data but the compressed raster data (No in step s83), as in the third embodiment, expands the compressed raster data (step S89) and sends the expanded data to the printer engine 4 (step S88).

By contrast, the CPU 8, when judging that the head page of the hybrid job is the image data (Yes in step S83), executes the following routine.

Namely, the CPU 8 at first judges whether the image data format is supported by PDL or not (step S84).

The CPU 8, when judging that the image data format is not supported by PDL (No in step S84), converts the image data into a format (e.g., the JPEG format) supported by PDL (step S85). Thereafter, as in the third embodiment, the CPU 8 adds a PDL description to the image data after being converted and rasterizes the data and sends the raster data to the printer engine 4 (steps S86 through S88).

The CPU 8, whereas if judging that the image data format is the PDL-supported format (Yes in step S84), adds the PDL description without converting the image data (step s86), then rasterizes the data (step S87) and sends the raster data to the printer engine 4 (step S88).

The CPU 8, after executing the routine (steps S82 through S88) described above for all the pages of the hybrid job (Yes in step S82), terminates this routine C2'.

As discussed above, according to the fourth embodiment, the image data inputted from the scanner 15 or the FAX 16 are, even if not supported by PDL, converted into the PDL-supported image data when executing the hybrid printing, and hence even the PDL-unsupported image data can be set as the hybrid printing target data.

Fifth Embodiment

A fifth embodiment schemes to uniformize color tones of the images printed on the respective sheets by unifying color resources-related settings (such as a sharpness setting, a photo/text mode, etc.) described in the respective PDL jobs that are hybrid-printed.

The fifth embodiment will hereinafter be discussed in depth.

Figure 14:
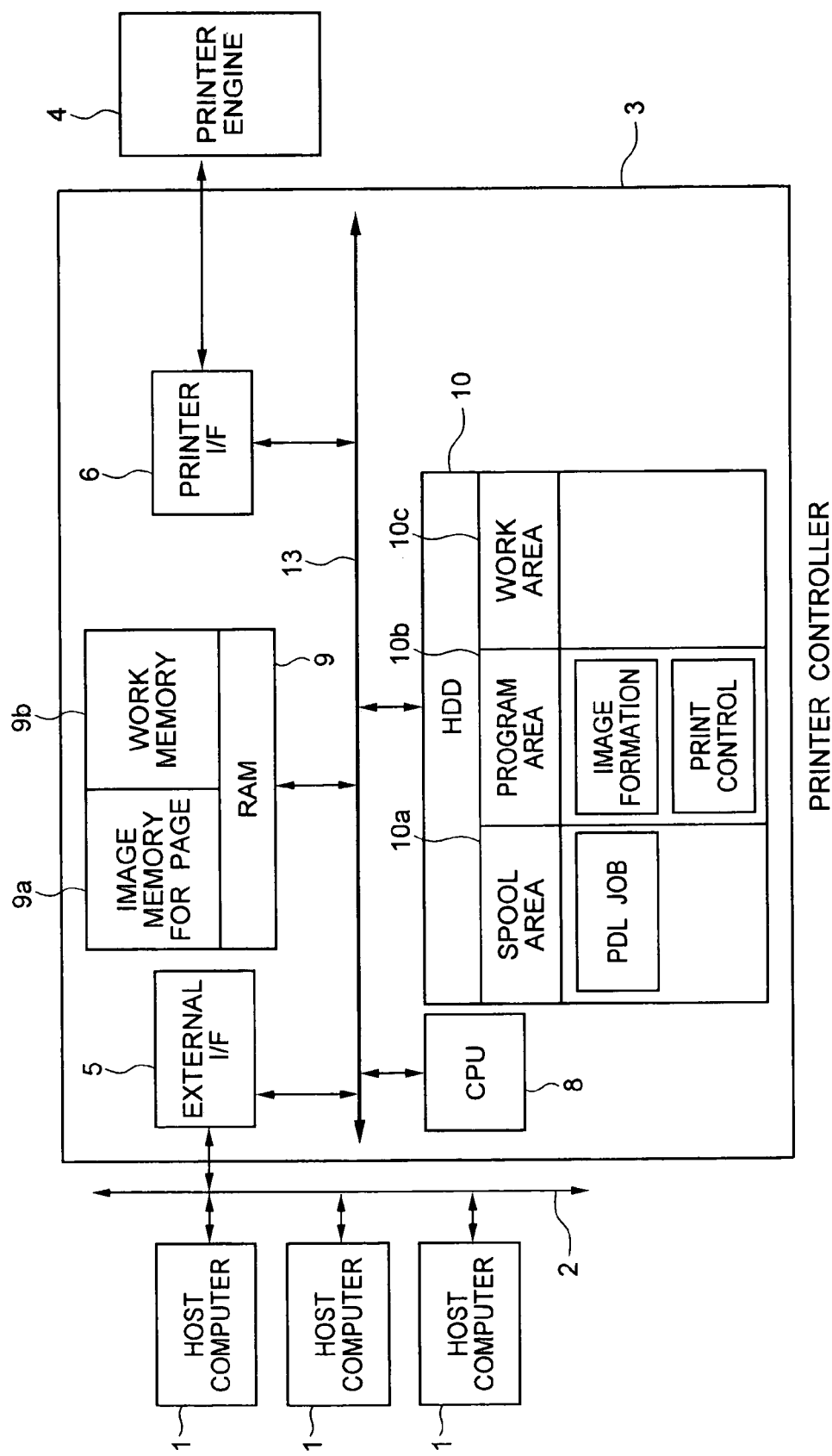
FIG. 14 is a block diagram showing an system configuration of the image forming system in a fifth embodiment.

FIG. 14 is a block diagram showing a system configuration of the image forming system in the fifth embodiment.

Unlike the image forming system exemplified in the first embodiment (see FIG. 1), this image forming system is provided with neither the image compression device nor the image expansion device. This is because the raster data are neither compressed nor expanded in the fifth embodiment.

The spool area 10a on the HDD 10 is stored with the PDL jobs received from the host computer 1. On the other hand, the program area 10b is stored with the print control program in the fifth embodiment that will be explained later on. Other configurations are the same as those in the first embodiment, and hence their detailed explanations are omitted.

Next, a processing procedure by the CPU 8 using the print control program in the fifth embodiment, will be described.

Figure 15:
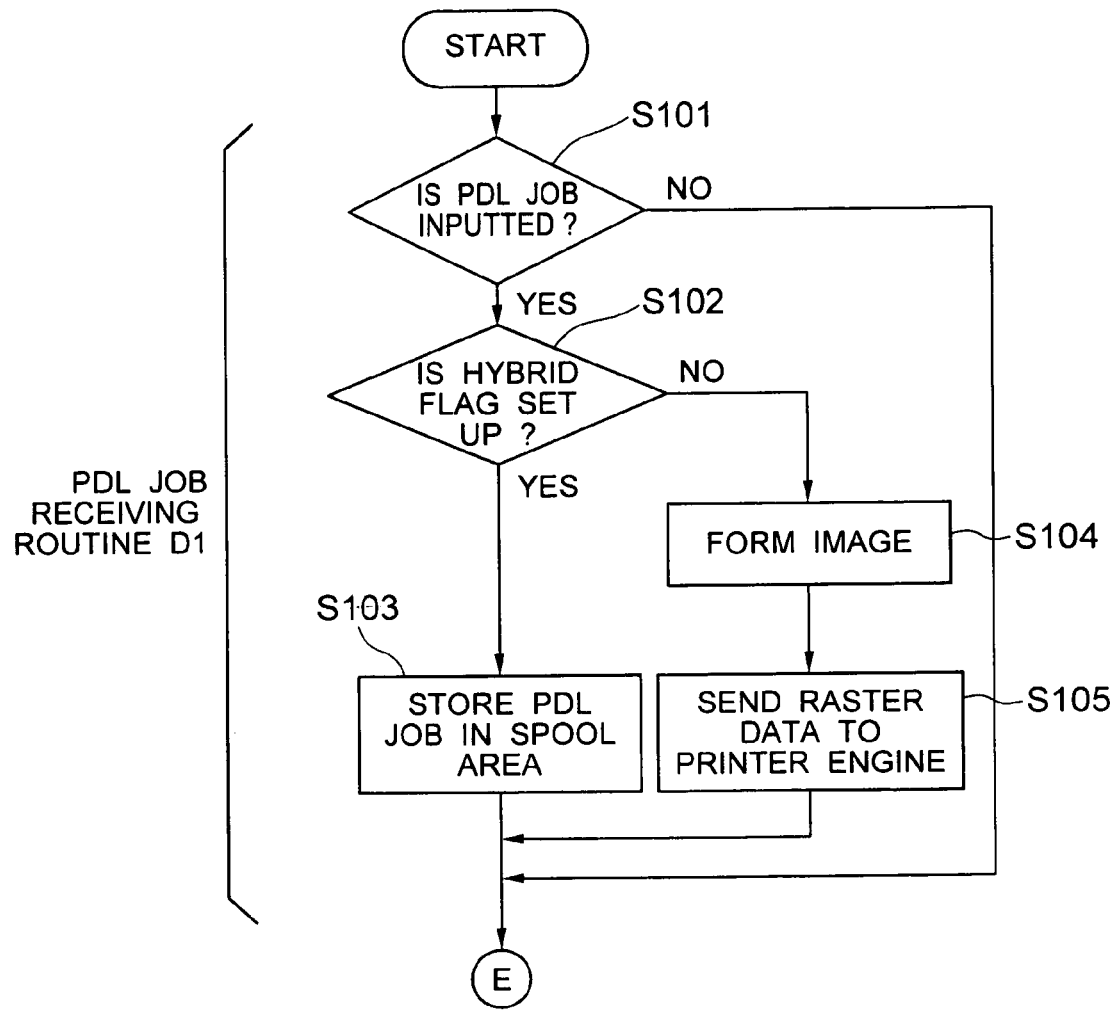
FIG. 15 is a flowchart showing an image data receiving procedure by the CPU in the fifth embodiment.
Figure 16:
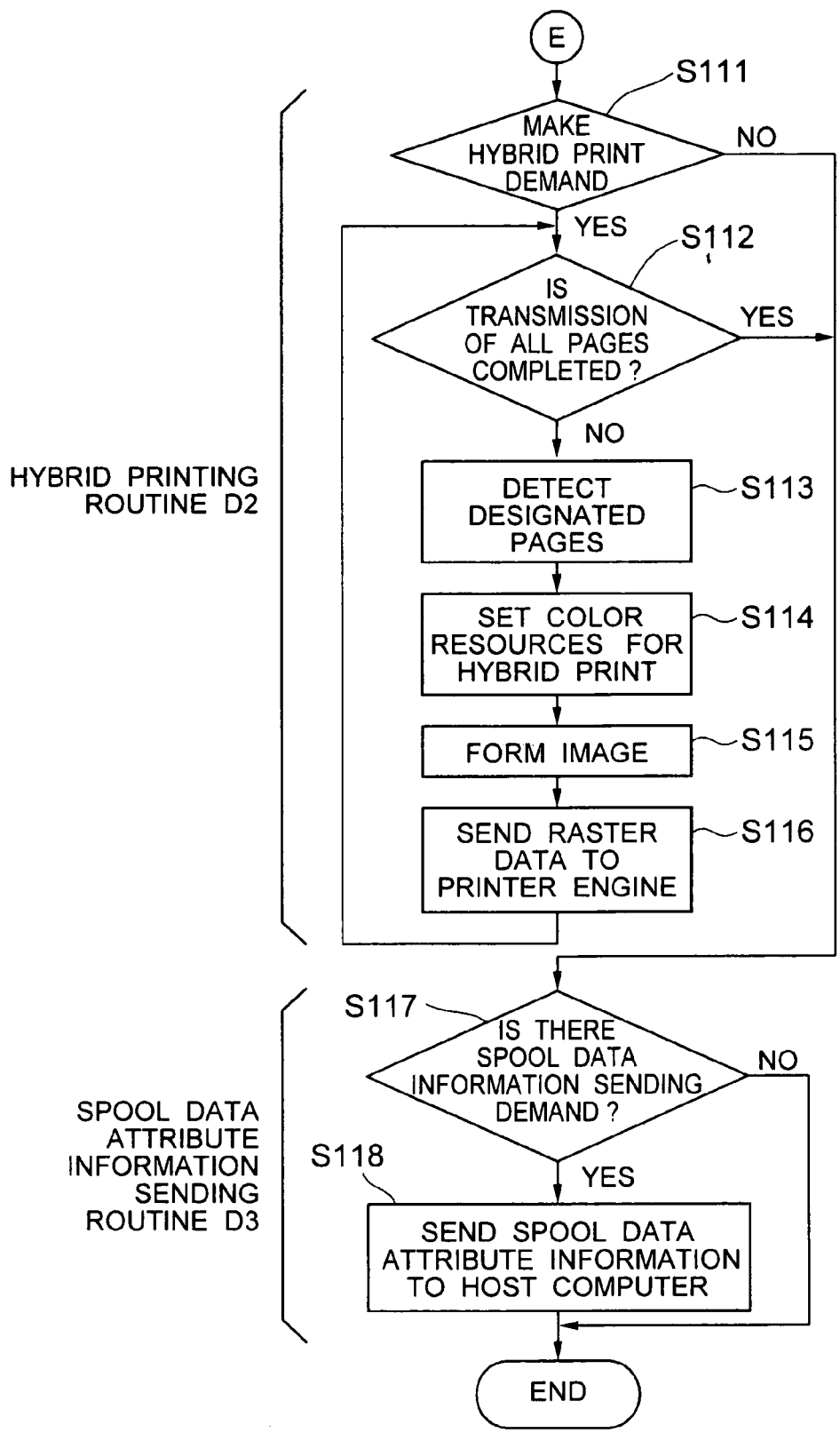
FIG. 16 is a flowchart showing steps subsequent to those in FIG. 15.

FIGS. 15 and 16 are flowcharts showing this processing procedure.

This processing procedure consists of a PDL job receiving routine D1 (see FIG. 15), a hybrid printing routine D2 (see FIG. 16) and a spool data attribute information sending routine D3 (see FIG. 16). The spool data attribute information sending routine D3 is the same as the spool data attribute information sending routine A2 (see FIG. 4). Such being the case, the following discussion will be focused on the PDL job receiving routine D1 and the hybrid printing routine D2.

The discussion starts with explaining the PDL job receiving routine D1 with reference to FIG. 15.

This PDL job receiving routine D1 is a routine for storing the PDL jobs received by the external I/F 5 from the host computer 1 in, e.g., the spool area 10a in an as-is state. To be specific, according to the first embodiment, the PDL jobs are rasterized and compressed and thus stored. In this routine D1, however, the PDL jobs are stored as they are. The following is a description in greater detail.

To begin with, as in the first embodiment, the CPU 8 judges whether or not the external I/F 5 receives the PDL job from the host computer 1 (step S101).

The CPU 8, when judging that the external I/F 5 does not receive the PDL job (No in step S101), terminates this routine D1.

While on the other hand, the CPU 8, when judging the external I/F 5 receives the PDL job (Yes in step S101), judges whether a hybrid flag in the PDL job is set up or not (step S102).

The CPU 8, when judging that the hybrid flag in the PDL job is set up (Yes in step S102), stores the PDL job in the spool area 10*a*.

On the other hand, the CPU 8, when judging that the hybrid flag in the PDL job is not set up (No in step S102), as in the first embodiment, rasterizes the each set of PDL page data of the PDL job (step S104), and sends the raster data to the printer engine 4 (step S105).

Next, the hybrid printing routine D2 will be explained with reference to FIG. 16.

This hybrid printing routine D2 is a routine for performing the hybrid printing by use of the PDL jobs stored in the spool area 10*a*. The hybrid printing routine D2 is, on this occasion, characterized such that the color resource settings in the respective PDL jobs are unified, and only the PDL page data requiring an execution of the actual printing among the sets of PDL page data of the respective PDL jobs are rasterized. A more detailed explanation is given as follows.

To start with, as in the first embodiment, the CPU 8 judges whether the external I/F 5 receives a hybrid print demand (a hybrid print instruction and hybrid output information) (step S111).

The CPU 8, when judging that the external I/F 5 does not receive the hybrid print demand (the hybrid print instruction and the hybrid output information) (No in step S111), terminates this routine D2.

On the other hand, the CPU 8, when judging that the external I/F 5 receives the hybrid print demand (the hybrid print instruction and the hybrid output information) (Yes in step S111), hybrid-prints the respective PDL jobs in the spool area 10*a* in accordance with the hybrid output information (steps S112 through S116). The following is an explanation in greater detail.

To begin with, FIG. 18 showing a table of contents of the hybrid output information described above, is referred to.

This table shows a PDL file name (a PDL job name) and print pages of each PDL file. Specifically, it is shown that pages 5-8 of a PDL file 1234.ps and pages 1-2 of a PDL file 5678.ps are printed in this sequence.

Figure 19:
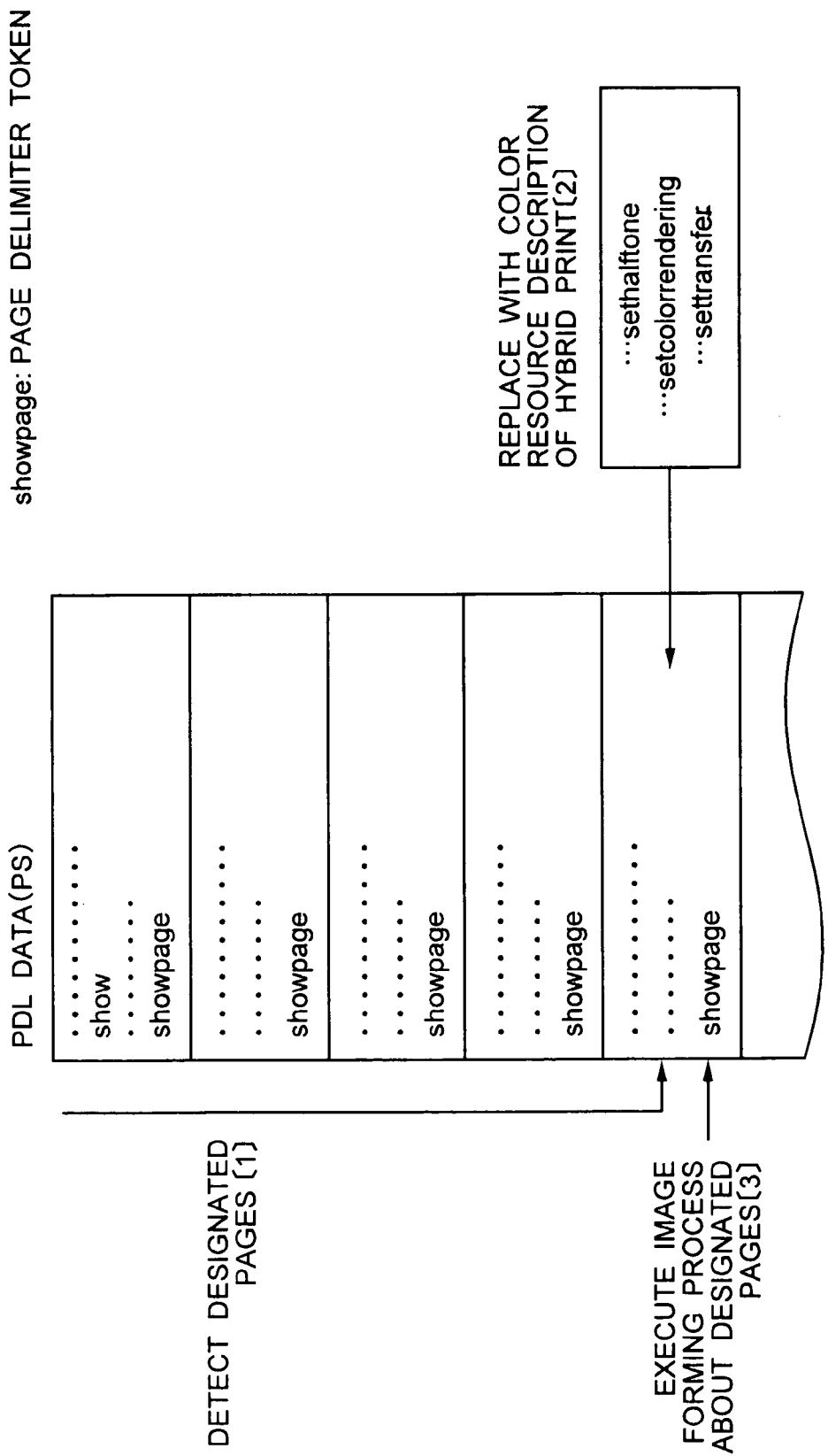
FIG. 19 is a diagram showing a structure of a PDL file (PDL job).

Next, FIG. 19 is referred to. FIG. 19 shows an outline of a file structure of the PDL file 1234.ps in FIG. 18.

As shown in FIG. 19, this PDL file 1234.ps has a page delimiter token "showpage" stored at every page delimiter. In head page, "show" is an operator representing an instruction of printing a character string, etc., and, for example, "(ABC) show" indicates printing a character string "ABC".

Steps (steps S112 through S116) subsequent to the hybrid printing routine D2 described above will be explained referring to FIGS. 18 and 19.

The CPU 8, when judging in step S111 that the hybrid print demand (the hybrid print instruction and the hybrid output information), specifies a page 5 as a first print page by use of the PDL file "1234.ps" on the basis of the hybrid output information (see FIG. 18) (steps S112, S113). To be more specific, the CPU 8 detects the page 5 by counting the page delimiter tokens in the PDL file "1234.ps" ([1] in FIG. 19).

The CPU 8 having detected the page 5 changes the color resource-related settings (such as the sharpness setting, the photo/text mode setting, etc.) in the page 5 to setting contents prepared mapping to a category of the PDL language (step S114:[2] in FIG. 19). This change is made specifically as follows.

Figure 17:
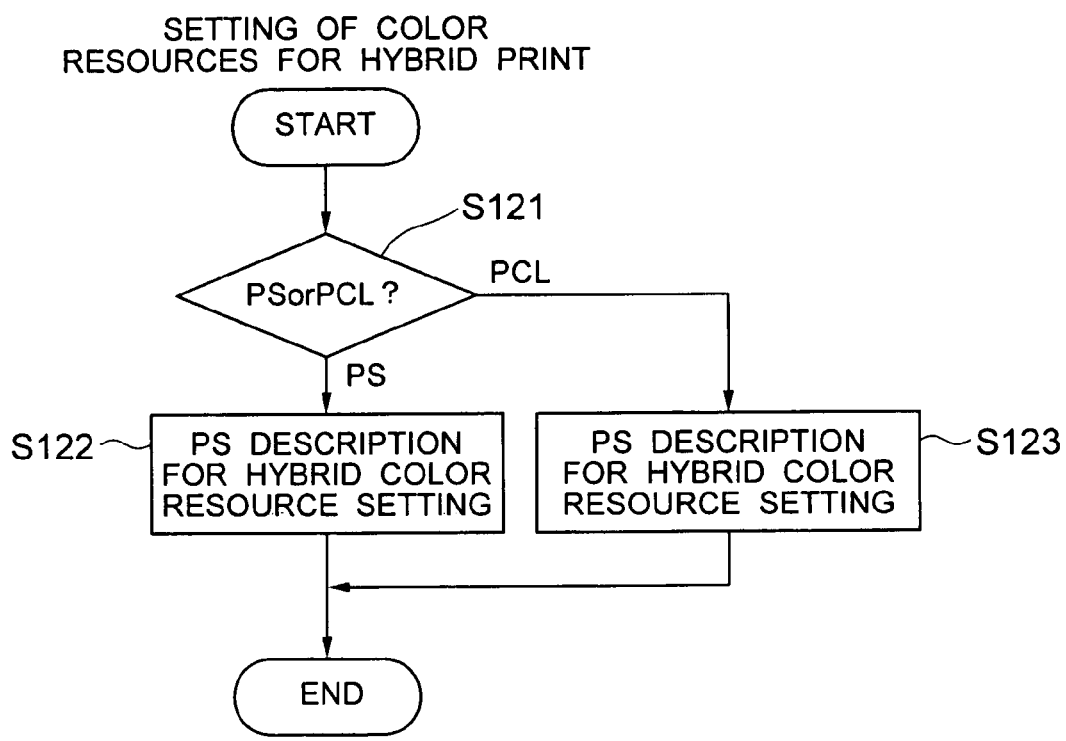
FIG. 17 is a flowchart showing details of a color resource setting routine in FIG. 16.

FIG. 17 is a flowchart showing steps of changing the color resource settings.

As shown in FIG. 17, the CPU 8 judges which category the PDL language in the page 5 comes under (step S121). The CPU 8, when judging that the PDL language in the page 5 is categorized as a PS (Post Script) language (PS in step S121), replaces a description of the color resource in the page 5 with a predetermined PS language-based color resource description (step S122). The example shown in [2] in FIG. 19 corresponds to this case. Note that "sethalftone" in FIG. 19 is an operator for designating a table utilized for a gradation process when rasterizing the PDL page data. An operator "setcolorrendering" serves to designate a color expression, e.g., sharpness, etc. An operator "settransfer" serves to designate a table utilized for a gamma correction. On the other hand, the CPU 8, when judging that the PDL language in the page 5 is PCL (Printer Command Language) (registered trademark) (PCL in step S121), replaces the color resource description in the page 5 with a predetermined PCL-based color resource description (step S123). Note that PS is a language developed by Adobe Systems Incorporated, and PCL is a language developed by Hewlett-Packard Company.

The CPU 8 having changed the color resource description in the page 5 (step S114 in FIG. 16) rasterizes the page 5 on the basis of the image forming program (step S115), and sends the rasterized page 5 to the printer engine 4 (step S116).

The CPU 8, after executing steps S112 through S116 for remaining pages 6-8 of the PDL file "1234.ps" and pages 1-2 of the PDL file "5678.ps", terminates this routine D2.

As discussed above, according to the fifth embodiment, the color resource-related settings described in the respective PDL jobs that are hybrid-printed are unified, thereby making it possible to uniformize the respective color tones of the images printed on the sheets.

Further, according to the fifth embodiment, the PDL job is utilized as the hybrid printing target, and hence the spool area 10*a* can be saved. Namely, in the first embodiment, the compressed job is used as the hybrid printing target, and therefore the compressed job having the larger data size than the PDL job is stored in the spool area 10*a*. According to the fifth embodiment, however, since the PDL job is set as the hybrid printing target, and therefore the PDL job having the smaller data size than the compressed job may be stored in the spool area 10*a*. Accordingly, in the fifth embodiment, the spool area 10*a* can be utilized more effectively.

Further, according to the fifth embodiment, only the PDL page data requiring the actual printing among the respective sets of PDL page data of the PDL job are rasterized, whereby the hardware resources can be utilized highly efficiently by omitting futile processes.

What is claimed is:

1. An image forming system comprising:
   a PDL job receiving unit for receiving a PDL job generated by use of a page description language and having print direct information;
   a print image forming unit for forming a print image by interpreting the PDL job;
   a storage unit for storing the print images;
   a hybrid print demand receiving unit for receiving a hybrid print demand for demanding a hybrid print of a plurality of print images in said storage unit;

a print direction determining unit for unifying print directions of the plurality of print images demanded by the hybrid print demand and thus determining the print direction;

an image converting unit for converting the print images into print images having the same print direction; and a transmitting unit for transmitting the print images and the post-converted print images formed by said image converting unit to a printer engine, wherein the image forming system further comprises a control unit for, when judging that said PDL job receiving unit receives the PDL job, forming the print image from the PDL job by use of said print image forming unit, storing the print image in said storage unit, and when judging that said hybrid print demand receiving unit receives the hybrid print demand, making said print direction determining unit determine the same print direction by use of the plurality of print images specified by the hybrid print demand in said storage unit, converting the print images that are not coincident with the same print direction among the plurality of print images into print images having the same print direction by use of said image converting unit, and sending the print images that are coincident with the same print direction and the post-converted print images to said printer engine in a sequence based on the hybrid print demand, and wherein said print direction determining unit totals page counts on a print-direction basis by use of the plurality of print images demanded by the hybrid print demand, and determines the same print direction by taking the print direction exhibiting a larger total page count.

2. The system according to claim 1, further comprising:

a compression unit for compressing the print image formed by said print image forms unit and forming a compressed job including a compressed image; and an expansion unit for expanding the compressed image; wherein said storage unit stores the compressed job formed by said compression unit;

said hybrid print demand receiving unit receives the hybrid print demand that demands a single or a plurality of compressed jobs in said storage unit to be hybrid-printed; and said control unit, when judging that the PDL job receiving unit receives the PDL job, forming the compressed job from the PDL job by use of said print image forming unit and compression unit, and stores the compressed job in said storage unit, when judging that said hybrid print demand receiving unit receives the hybrid print demand, makes said print direction determining unit determine the same print direction by use of the plurality of compressed images included in a single or a plurality of compressed jobs demanded by the hybrid print demand in said storage unit, converts the compressed images that are not coincident with the same print direction among the plurality of compressed images into compressed images having the same print direction by use of said image converting unit, generates a hybrid job containing the compressed images that are coincident with the same print direction and the post-converted compressed images, expands the images sequentially from the head image of the hybrid job by use of said expansion unit, and sends expanded images to said printer engine in a sequence based on the hybrid print demand.

3. The system according to claim 2, wherein the hybrid print demand includes hybrid output information which specifies a compressed job name of hybridizing target jobs and a hybridizing method.

4. The system according to claim 1, further comprising:

a compression unit for compressing the print image formed by said print image forming unit; and an expansion unit for expanding the compressed image; wherein said storage unit stores the compressed image formed by said compression unit;

said hybrid print demand receiving unit receives the hybrid print demand that demands the compressed images in said storage unit to be hybrid-printed;

the PDL job has a hybrid flag indicating whether the PDL job is a hybrid printing target job or not; and said control unit, when judging that the PDL job receiving unit receives the PDL job, judges based on the hybrid flag whether the PDL job is the hybrid printing target job or not, when judging that the PDL job is the hybrid printing target job, forms the print image from the PDL job by use of said print image forming unit, compresses the print image by use of said compression unit and stores the compressed image in said storage unit, and when judging that said hybrid print demand receiving unit receives the hybrid print demand, makes said print direction determining unit determine the same print direction by use of the plurality of compressed images demanded by the hybrid print demand in said storage unit, converts the compressed images that are not coincident with the same print direction among the plurality of compressed images into compressed images having the same print direction by use of said image converting unit, expands the compressed image that are coincident with the same print direction and the post-converted compressed images by use of said expansion unit to generate expanded images, and sends the expanded images to said printer engine in the sequence based on the hybrid print demand.

5. The system according to claim 4, wherein said control unit forms the print image from the PDL job by use of said print image forming unit and sends the print image to said printer engine without compressing the print image when judging that the PDL job is not the hybrid printing target job based on the hybrid flag.

6. The system according to claim 1, further comprising:

a compression unit for compressing the print image formed by said print image forming unit; and an expansion unit far expanding the compressed image; wherein said storage unit stores the compressed image formed by said compression unit;

said hybrid print demand receiving unit receives the hybrid print demand that demands the compressed images in said storage unit to be hybrid-printed; and said control unit, when judging that the PDL job receiving unit receives the PDL job, forms the print image from the PDL job by use of said print image forming unit, compresses the print image by use of said compression unit and stores the compressed image in said storage unit, when judging that said hybrid print demand receiving unit receives the hybrid print demand, makes said print direction determining unit determine the same print direction by use of the plurality of compressed images demanded by the hybrid print demand in said storage unit, converts the compressed images that are not coincident with the same print direction among the plurality of compressed images into compressed images having the same print direction by use of said image converting unit, expands the compressed images and the post-converted compressed images by use of said expansion unit generate expanded images, and sends the expanded images to said printer engine in the sequence based on the hybrid print demand, and further when judging that an attribute information transmission demand for demanding a transmission of attribute information of the compressed image stored in said storage unit is received from a user terminal, extracts the attribute information from the compressed image demanded by the attribute information transmission demand, and sends extracted attribute information to the user terminal.

7. The system according to claim 1, wherein a conversion of the print image by said image converting unit is a rotation through 90 degrees for the print image.

8. The system according to claim 1, wherein the PDL job receiving unit receives the PDL job from a host computer via a network; and said hybrid print demand receiving unit receives the hybrid print demand from the host computer via the network.

9. The system according to claim 1, wherein the PDL job has PDL page data for a plurality of pages, and said print image forming unit forms a plurality of print images by interpreting the PDL job.

10. The system according to claim 1, wherein a storage unit is an HDD.

* * * * *